(12) United States Patent
Hario et al.

(10) Patent No.: US 11,909,201 B2
(45) Date of Patent: Feb. 20, 2024

(54) MULTI-TERMINAL DC POWER TRANSMISSION SYSTEM, COMMON CONTROL DEVICE THEREOF, AND FAULT RECOVERY METHOD FOR MULTI-TERMINAL DC POWER TRANSMISSION SYSTEM

(71) Applicant: Mitsubishi Electric Corporation, Tokyo (JP)

(72) Inventors: Masahiro Hario, Tokyo (JP); Yasunori Ido, Tokyo (JP); Noriyuki Imada, Tokyo (JP); Keisuke Ishida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 61 days.

(21) Appl. No.: 17/791,397

(22) PCT Filed: Feb. 4, 2020

(86) PCT No.: PCT/JP2020/004122
§ 371 (c)(1),
(2) Date: Jul. 7, 2022

(87) PCT Pub. No.: WO2021/156936
PCT Pub. Date: Aug. 12, 2021

(65) Prior Publication Data
US 2023/0043622 A1 Feb. 9, 2023

(51) Int. Cl.
*H02H 7/26* (2006.01)
*H02H 3/087* (2006.01)
*H02J 3/38* (2006.01)

(52) U.S. Cl.
CPC ............ *H02H 7/268* (2013.01); *H02H 3/087* (2013.01); *H02J 3/381* (2013.01); *H02J 2300/28* (2020.01)

(58) Field of Classification Search
CPC ......... H02H 7/268; H02H 3/087; H02J 3/381; H02J 2300/28
See application file for complete search history.

(56) References Cited

U.S. PATENT DOCUMENTS

| 9,698,589 | B1 | 7/2017 | Leyh | |
| 10,693,293 | B2 * | 6/2020 | Qi | ............................ H02H 9/02 |
| 2013/0286521 | A1 | 10/2013 | Park | |

FOREIGN PATENT DOCUMENTS

| CA | 2860139 C | 9/2015 |
| EP | 3306766 A1 | 4/2018 |

(Continued)

OTHER PUBLICATIONS

Beheshtaein , et al., "Review on Microgrids Protection", IET Generation, Transmission & Distribution, vol. 13, No. 6, XP006104464, Mar. 22, 2019, pp. 743-759.

(Continued)

*Primary Examiner* — Carlos Amaya
(74) *Attorney, Agent, or Firm* — BUCHANAN INGERSOLL & ROONEY PC

(57) ABSTRACT

In a multi-terminal DC power transmission system, a common control device is connected to a plurality of individual protective devices via a first communication network. Each of the individual protective devices is configured, when detecting change in current or voltage in a corresponding protection zone, to output a fault signal to the common control device via the first communication network and open the corresponding DC circuit breaker such that the corresponding protection zone is disconnected from the multi-terminal DC power grid and deenergized. The common control device estimates a fault occurrence zone where a fault occurs among a plurality of protection zones, based on a plurality of received fault signals. The common control device requests an individual protective device correspond- (Continued)

ing to a deenergized protection zone of the protection zones excluding the fault occurrence zone to reclose the DC circuit breaker such that the deenergized protection zone is restored.

13 Claims, 14 Drawing Sheets

(56) References Cited

FOREIGN PATENT DOCUMENTS

| JP | 2016226174 A | 12/2016 |
|----|--------------|---------|
| JP | 2017011916 A | 1/2017  |

OTHER PUBLICATIONS

Extended European Search Report issued in corresponding European Patent Application No. 20917939.9, dated Feb. 15, 2023, 13 pages.
International Search Report (PCT/ISA/210) with translation and Written Opinion (PCT/ISA/237) dated Mar. 17, 2020, by the Japan Patent Office as the International Searching Authority for International Application No. PCT/JP2020/004122.

* cited by examiner

FIG.13
(A) COMMUNICATION PACKET OF FAULT SIGNAL
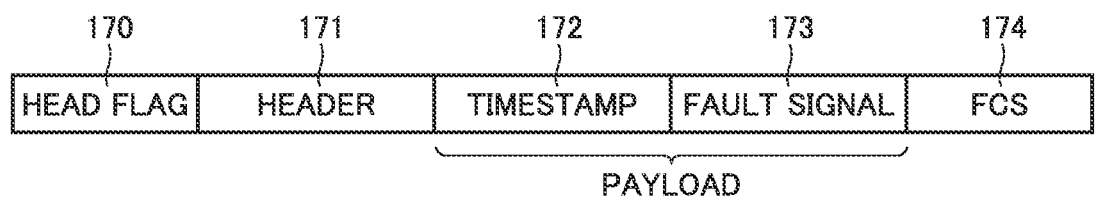
(B) COMMUNICATION PACKET OF RECLOSING INSTRUCTION
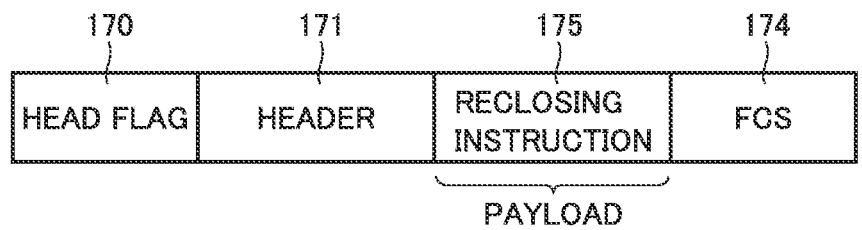

MULTI-TERMINAL DC POWER TRANSMISSION SYSTEM, COMMON CONTROL DEVICE THEREOF, AND FAULT RECOVERY METHOD FOR MULTI-TERMINAL DC POWER TRANSMISSION SYSTEM

TECHNICAL FIELD

The present disclosure relates to a multi-terminal DC power transmission system, a common control device thereof, and a fault recovery method for the multi-terminal DC power transmission system.

BACKGROUND ART

For power transmission from power generators away from urban areas, such as offshore wind farms, to urban areas that are power demand areas, the use of high-voltage direct current (HVDC) power transmission has been considered as an alternative to high-voltage AC power transmission. High-voltage DC power transmission is advantageous in that power transmission loss is lower than high-voltage AC power transmission but disadvantageous in that because of low system impedances a fault propagation range is spreading fast when an earth fault or a short circuit fault occurs.

Japanese Patent Laying-Open No. 2016-226174 (PTL 1) discloses a multi-terminal DC power transmission system for promptly and safely restoring a section where a transient fault has been eliminated to a system. Specifically, in a multi-terminal DC power transmission system in this literature, the control unit causes switches to perform opening actions so as to disconnect the section where a fault occurs from the DC power transmission path and thereafter causes one of the opened switches to perform a closing action. The control unit thereafter causes the one closed switch to perform a re-opening action when the detection unit detects that the fault is still occurring, and returns all of the switches opened in order to disconnect the fault section from the DC power transmission path when the detection unit does not detect that the fault is still occurring.

CITATION LIST

Patent Literature

PTL 1: Japanese Patent Laying-Open No. 2016-226174

SUMMARY OF INVENTION

Technical Problem

In a DC power grid in which a fault propagation range is rapidly spreading, when a fault zone is disconnected from a system by opening circuit breakers in a short time after a fault occurs, a plurality of protection zones including the fault zone may be deenergized by the opening of their corresponding circuit breakers. In such a case, healthy zones other than the fault zone among the deenergized protection zones need to be promptly restored.

Unfortunately, with the method disclosed in Japanese Patent Laying-Open No. 2016-226174 (PTL 1), it is difficult to promptly restore healthy zones included in the deenergized zones. This is because the method in this literature determines the health by checking whether a fault is continuously occurring when one circuit breaker in a deenergized zone is opened, and therefore it takes a considerable time to check the health of all of the deenergized zones.

The present disclosure is made in view of the problem above and an object of the present disclosure is to provide means for promptly restoring a plurality of healthy zones deenergized by opening their respective circuit breakers when a fault occurs in a multi-terminal DC power transmission system.

Solution to Problem

A multi-terminal DC power transmission system according to an embodiment includes a multi-terminal DC power grid, a plurality of individual protective devices, and a common control device. The multi-terminal DC power grid includes a plurality of protection zones, and each protection zone is divided from an adjacent protection zone by a DC circuit breaker. The individual protective devices are provided corresponding to the protection zones. The common control device is connected to the individual protective devices via a first communication network. Each of the individual protective devices is configured, when detecting change in voltage or current in a corresponding protection zone due to fault occurrence in any of the protection zones, to output a fault signal pertaining to the fault occurrence to the common control device via the first communication network and open a DC circuit breaker that divides the corresponding protection zone such that the corresponding protection zone is disconnected from the multi-terminal DC power grid and deenergized. The common control device is configured to estimate a fault occurrence zone where a fault occurs among the protection zones, based on a plurality of received fault signals. The common control device is configured to request an individual protective device of the plurality of individual protective devices, corresponding to a deenergized protection zone of the plurality of protection zones excluding the fault occurrence zone to reclose the DC circuit breaker that divides the deenergized protection zone such that the deenergized protection zone is restored.

Advantageous Effects of Invention

The fault occurrence zone is estimated based on fault signals received from the individual control devices detecting faulty current, whereby a plurality of healthy zones deenergized by opening respective circuit breakers when a fault occurs can be promptly restored.

BRIEF DESCRIPTION OF DRAWINGS

FIG. 13 is a diagram illustrating a configuration example of a communication packet including a fault signal and a communication packet including a reclosing instruction explained in FIG. 12.

DESCRIPTION OF EMBODIMENTS

Embodiments will be described in detail below with reference to the drawings. Like or corresponding parts are denoted by like reference signs and a description thereof is not repeated.

First Embodiment

[Configuration Example of Multi-Terminal DC Power Transmission System]

Figure 1:
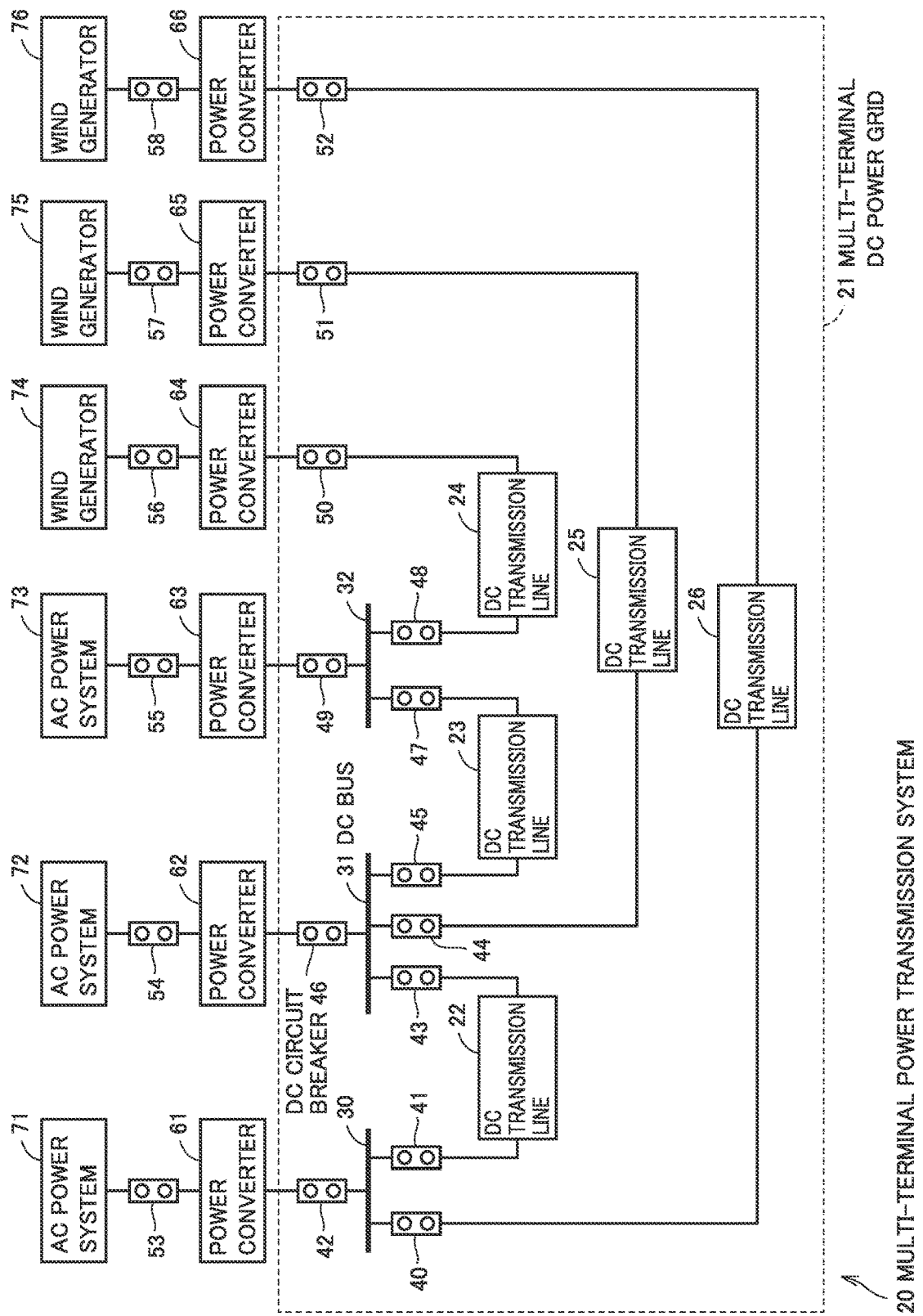
FIG. 1 is a diagram illustrating an exemplary configuration of a multi-terminal DC power transmission system.

FIG. 1 is a diagram illustrating an exemplary configuration of a multi-terminal DC power transmission system. Referring to FIG. 1, multi-terminal DC power transmission system 20 transmits AC power generated by wind generators 74, 75, 76 to AC power systems 71, 72, 73.

Multi-terminal DC power transmission system 20 includes a multi-terminal DC power grid 21 and power converters 61 to 66. In the example illustrated in FIG. 1, power converters 61 to 63 are respectively connected between AC power systems 71, 72, 73 and multi-terminal DC power grid 21 to convert AC power into DC power and convert DC power into AC power. Power converters 64 to 66 are respectively connected between wind generators 74, 75, 76 and multi-terminal DC power grid 21 to convert AC power into DC power and convert DC power into AC power. As used herein multi-terminal DC power transmission line refers to DC transmission line connected to three or more power converters.

Multi-terminal DC power grid 21 is divided into a plurality of protection zones. Each protection zone is connected to an adjacent protection zone through a DC circuit breaker. In the example illustrated in FIG. 1, multi-terminal DC power grid 21 includes three protection zones configured with DC buses 30 to 32 and five protection zones configured with DC transmission lines 22 to 26.

DC buses 30 to 32 and DC transmission lines 22 to 26 each may be formed as a single-circuit bus and transmission line composed of one main line and one return line or may be formed as a two-circuit bus and transmission line composed of two main lines and one return line. In either case, each line is illustrated as one electrical line in FIG. 1 and FIG. 2 for simplification of illustration.

Specifically, in FIG. 1, a protection zone configured with DC bus 30 is divided into a protection zone configured with DC transmission line 26 through a DC circuit breaker 40 and a protection zone configured with DC transmission line 22 through a DC circuit breaker 41. DC bus 30 is further connected to power converter 61 through a DC circuit breaker 42.

Similarly, a protection zone configured with DC bus 31 is divided into protection zones configured with DC transmission lines 22, 25, 23 through DC circuit breakers 43, 44, 45, respectively. DC bus 31 is further connected to power converter 62 through a DC circuit breaker 46.

Similarly, a protection zone configured with DC bus 32 is divided into protection zones configured with DC transmission lines 23, 24 through DC circuit breakers 47, 48, respectively. DC bus 32 is further connected to power converter 63 through a DC circuit breaker 49.

For five protection zones configured with DC transmission lines 22 to 26, both ends of each protection zone are also provided with corresponding two DC circuit breakers among DC circuit breakers 40, 41, 43 to 45, 47, 48, 50 to 52. Each protection zone is divided from an adjacent protection zone or connected to the corresponding one of power converters 64 to 66 through the corresponding DC circuit breaker.

As illustrated in FIG. 1, AC circuit breakers 53 to 58 are respectively provided between power converters 61 to 63 and AC power systems 71 to 73 and between power converters 64 to 66 and wind generators 74 to 76. Power converters 64 to 66 are installed corresponding to wind generators 74 to 76 and form back-to-back (BTB) systems.

Figure 2:
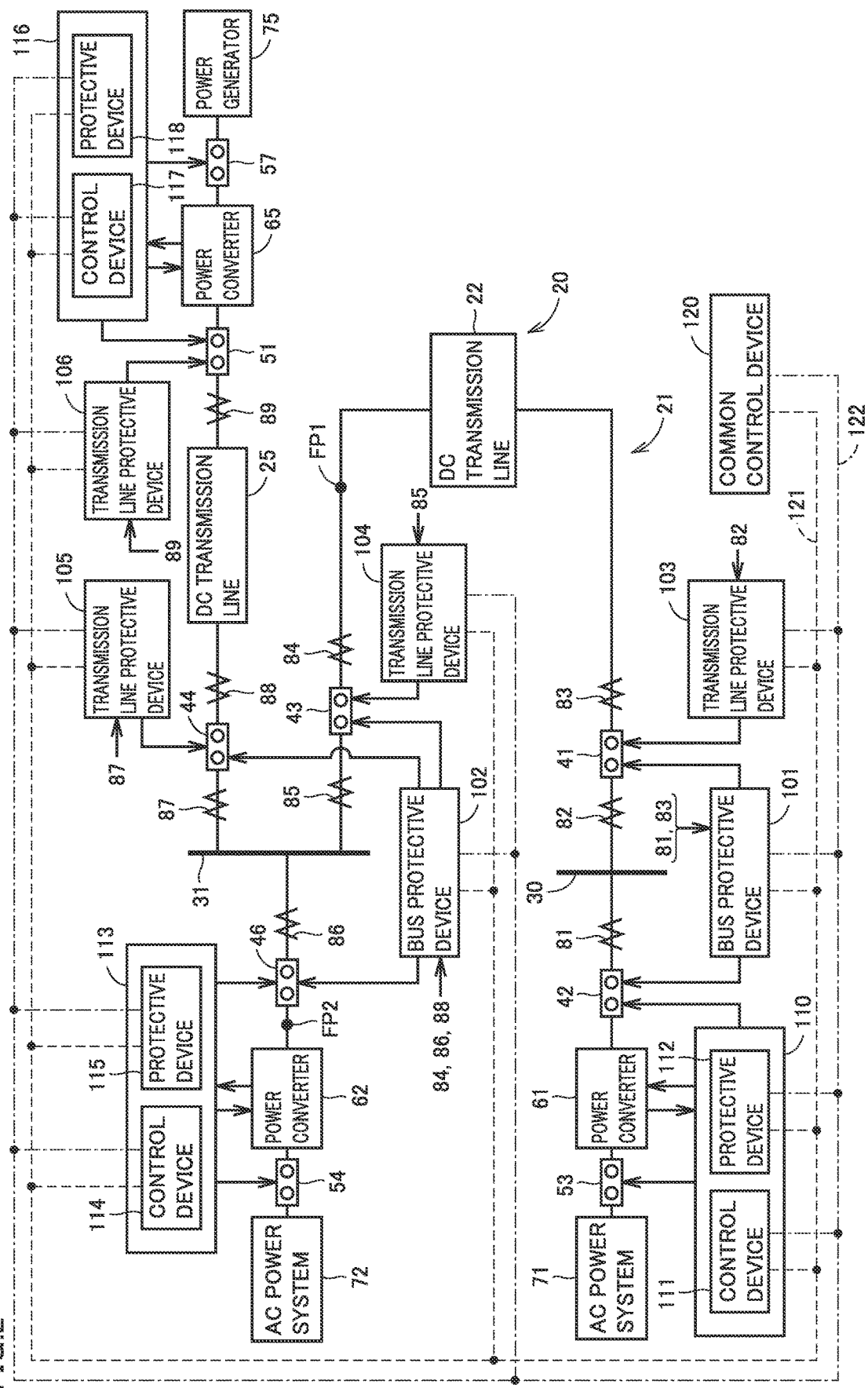
FIG. 2 is a diagram illustrating a partial configuration of the multi-terminal DC power transmission system in FIG. 1 in more detail.

FIG. 2 is a diagram illustrating a partial configuration of the multi-terminal DC power transmission system in FIG. 1 in more detail. In FIG. 2, among the components of multi-terminal DC power transmission system 20 illustrated in FIG. 1, DC buses 30, 31, DC transmission lines 22, 25, and power converters 61, 62, 65 are illustrated.

As illustrated in FIG. 2, multi-terminal DC power transmission system 20 further includes bus protective devices 101, 102 to protect DC buses 30, 31, transmission line protective devices 103 to 106 to protect DC transmission lines 22, 25, control protective devices 110, 113, 116 to control and protect power converters 61, 62, 65, and a common control device 120. Control protective device 110 may be divided into a control device 111 to control power converter 61 and a protective device 112 to protect power converter 61. Similarly, control protective device 113 may be divided into a control device 114 and a protective device 115, and control protective device 116 may be divided into a control device 117 and a protective device 118.

DC bus 32 not illustrated in FIG. 2 is also provided with a bus protective device similarly, and each of DC transmission lines 23, 24, 26 is also provided with a transmission line protective device similarly. Each of power converters 63, 64, 66 is also provided with a control protective device similarly. In the following description, a bus protective device and a transmission line protective device for protecting each protection zone in multi-terminal DC power grid 21 and a protective device for protecting a power converter may be collectively referred to as individual protective device. A control device for controlling a power converter and an individual protective device are collectively referred to as individual control protective device.

Common control device 120 is mutually connected to bus protective devices 101, 102, transmission line protective devices 103 to 106, and control protective devices 110, 113, 116 through communication networks 121, 122. In the present embodiment, multi-terminal DC power transmission system 20 includes high-speed communication network 121 for use only for communication associated with fault processing in multi-terminal DC power transmission system 20 and standard communication network 122 for performing normal communication that is not speed demanding. The provision of high-speed communication network 121 dedicated to fault processing in multi-terminal DC power transmission system 20 can increase the speed of communication between each individual control protective device and common control device 120 when a fault occurs in multi-terminal DC power grid 21. The communication scheme in communication networks 121, 122 will be described in a second embodiment.

The arrangement and the operation of the individual control protective devices and the common control device will be described below.

Control devices 111, 114, 117 for power converters 61, 62, 65 are each arranged for the corresponding power converter. Control devices 111, 114, 117 perform control for their corresponding power converters 61, 62, 65.

Protective devices 112, 115, 118 for power converters 61, 62, 65 are also each arranged for the corresponding power converter. Each of protective devices 112, 115, 118 detects a fault of an AC power system connected to the corresponding power converter, a fault of multi-terminal DC power grid 21, and a fault of the corresponding power converter. When detecting any of the faults above, each of protective devices 112, 115, 118 protects the corresponding power converter. Specifically, each of protective devices 112, 115, 118 stops the corresponding power converter or outputs a signal to request the control device to stop the corresponding power converter. Furthermore, each of protective devices 112, 115, 118 notifies common control device 120 that the corresponding power converter has been stopped, via high-speed communication network 121.

Unlike the foregoing, the determination to stop a power converter when a fault occurs may be made by control devices 111, 114, 117 or may be made by power converters 61, 62, 65 themselves. When power converters 61, 62, 65 detect a fault by themselves, power converters 61, 62, 65 transmit a fault detection signal indicating fault detection and a converter stop signal to request stopping of the failed power converter to the corresponding control devices 111, 114, 117 or protective devices 112, 115, 118 or to both of these devices. The fault detection signal and the converter stop signal may be implemented by a common signal.

Each of protective devices 112, 115, 118 detects a fault of the corresponding power converter 61, 62, 65 and, when it is determined that the fault is a permanent fault in the converter, outputs a trip signal to the corresponding AC circuit breaker 53, 54, 57, and outputs a trip signal to the corresponding DC circuit breaker 42, 46, 51. Control devices 111, 114, 117 may output a trip signal instead of protective devices 112, 115, 118. In protection of a power converter, when continuing the operation of the power converter is difficult although the converter itself does not have a fault, a gate pulse output for the power converter may be stopped. In such a case, unless the fault is determined as a permanent fault, the power converter enters a standby state with the gate pulse output stopped.

When a fault occurs on the corresponding DC bus 30, bus protective device 101 outputs a trip signal to the corresponding DC circuit breakers 41, 42 to prevent expansion of the influence of the fault to a feeder (that is, DC transmission line 22 and power converter 61) linked to DC bus 30. Similarly, when a fault occurs on the corresponding DC bus 31, bus protective device 102 outputs a trip signal to the corresponding DC circuit breakers 43, 44, 46 to prevent expansion of the influence of the fault to a feeder (that is, DC transmission lines 22, 25 and power converter 62) linked to DC bus 31. The fault propagation speed in multi-terminal DC power grid 21 is so fast that the fault often extends to the adjacent DC transmission line and power converter even when a trip signal is output immediately after fault detection.

Preferably, bus protective devices 101, 102 perform fault determination by a current differential relay scheme in order to improve the reliability in determination of a fault zone. Specifically, bus protective device 101 determines whether a fault occurs in its protection zone based on detection signals by DC current detectors 81, 83. Similarly, bus protective device 102 determines whether a fault occurs in its protection zone based on detection signals by DC current detectors 84, 86, 88. The overview of a fault detection method by the current differential relay scheme will be described later with reference to FIG. 6. When bus protective devices 101, 102 detect that a fault occurs on their protection zones, bus protective devices 101, 102 transmit a fault detection signal to common control device 120 via high-speed communication network 121 and output a trip signal to the corresponding circuit breakers.

Preferably, bus protective devices 101, 102 are configured to function as current differential relay elements as well as function as directional rate of change of current relay elements (or directional magnitude of change of current relay element). When a fault occurs on DC transmission lines 22, 25 linked to DC buses 30, 31, into which feeder faulty current flows out or from which feeder faulty current flows in is detected to facilitate estimation of a fault zone. The operation of the directional rate of change of current relay element (or directional magnitude of change of current relay element) will be described in detail with reference to FIG. 7. When bus protective devices 101, 102 detect that a fault occurs outside their protection zones, bus protective devices 101, 102 transmit a fault detection signal including information indicating the direction of inflow or outflow of faulty current to common control device 120 via high-speed communication network 121.

Transmission line protective devices 103, 104 are provided at both ends of the corresponding DC transmission line 22 and determine whether a fault occurs on DC transmission line 22 based on detection values from the corresponding DC current detectors 82, 85. When a fault occurs on DC transmission line 22, transmission line protective devices 103, 104 output a trip signal to the corresponding DC circuit breakers 41, 43 in order to disconnect DC transmission line 22 from multi-terminal DC power grid 21 to prevent expansion of the influence of the fault. The fault propagation speed in multi-terminal DC power grid 21 is so fast that the fault often extends to a healthy protection zone near the fault zone even when a trip signal is output immediately after fault detection. When detecting a fault, transmission line protective devices 103, 104 further transmit a fault detection signal to common control device 120 via high-speed communication network 121.

Similarly, transmission line protective devices 105, 106 are provided at both ends of the corresponding DC transmission line 25 and determine whether a fault occurs on DC transmission line 25 based on detection values from the corresponding DC current detectors 87, 89. When a fault occurs on DC transmission line 25, transmission line protective devices 105, 106 output a trip signal to the corresponding DC circuit breakers 44, 51 in order to disconnect DC transmission line 25 from multi-terminal DC power grid 21 to prevent expansion of the influence of the fault. The fault propagation speed in multi-terminal DC power grid 21 is so fast that the fault often extends to a healthy protection zone near the fault zone even when a trip signal is output immediately after fault detection. When detecting a fault, transmission line protective devices 105, 106 further transmit a fault detection signal to common control device 120 via high-speed communication network 121.

A current differential relay element is not used as a relay element for transmission line protective devices 103 to 106 in order to suppress propagation of the influence of the fault due to delay in communication time. An overcurrent relay element or an undervoltage relay element that performs fault determination using the quantity of input electricity that can be detected at its own terminal without using communication. A magnitude of change of current relay (rate of change of current relay) element or a magnitude of change of voltage relay (rate of change of voltage relay) element may be further employed. The directional rate of change of current relay element (or directional magnitude of change of current relay element) in the description of the bus protective device may be provided to transmit a fault detection signal including information indicating the inflow or outflow direction of faulty current to common control device 120 via high-speed communication network 121.

For a fault on DC transmission lines 22, 25, protective devices 112, 115, 118 may operate to stop a gate pulse output for the corresponding power converters 61, 62, 65 in order to protect power converters 61, 62, 65.

Common control device 120 estimates in which protection zone a fault occurs, based on fault detection signals received from bus protective devices 101, 102, transmission line protective devices 103 to 106, and control protective devices 110, 113, 116 via high-speed communication network 121. For example, a communication packet issued for transmission of a fault detection signal may include a timestamp indicating the fault detection time, whereby a fault zone can be estimated based on whether the timestamp is early or late. Furthermore, information on the direction of faulty current obtained from bus protective devices 101, 102 or transmission line protective devices 103 to 106 also can be used for estimation of a fault zone. When a fault occurs on DC bus 30, 31, a fault zone can be identified reliably based on the detection result of the current differential relay elements included in bus protective devices 101, 102.

Furthermore, common control device 120 instructs an individual protective device corresponding to a healthy deenergized zone to reclose the corresponding circuit breaker in order to promptly restore the healthy deenergized zone excluding the estimated fault zone among a plurality of protection zones deenergized by closing of the DC circuit breakers. The detailed operation procedure of common control device 120 will be described later with reference to FIG. 9 to FIG. 11.

[Configuration Example of Power Converter]

Figure 3:
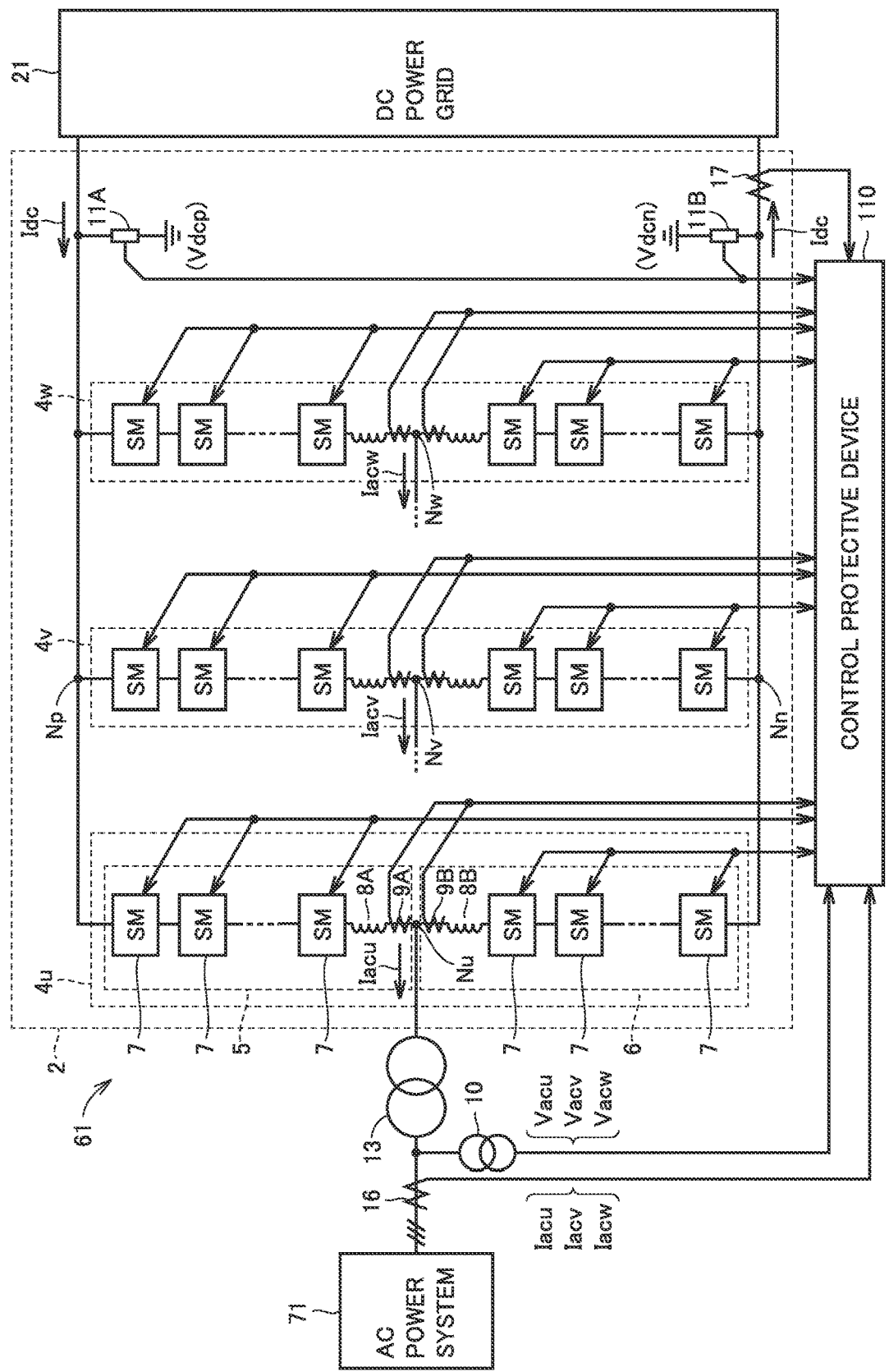
FIG. 3 is a diagram illustrating an exemplary configuration of a power converter in FIG. 2.

FIG. 3 is a diagram illustrating an exemplary configuration of a power converter in FIG. 2. Referring to FIG. 3, a configuration example of the power converter will be described in detail below.

Referring to FIG. 3, each of power converters 61 to 66 in FIG. 1 is composed of a modular multilevel converter including a plurality of converter cells connected in series to each other. The "converter cell" may be referred to as "submodule SM". In FIG. 3, power converter 61 connected between AC power system 71 and multi-terminal DC power grid 21 is illustrated as an example. Power converter 61 includes a power conversion circuit 2 and control protective device 110.

Power conversion circuit 2 includes a plurality of leg circuits 4u, 4v, and 4w (denoted as leg circuit 4 when they are collectively referred to or any one of them is referred to) connected in parallel with each other between a positive DC terminal (that is, high potential-side DC terminal) Np and a negative DC terminal (that is, low potential-side DC terminal) Nn.

Leg circuit 4 is provided for each of a plurality of phases forming alternating current. Leg circuit 4 is connected between AC power system 71 and DC power grid 21 to perform power conversion between those circuits. In FIG. 3, AC power system 71 is a three-phase alternating current system, and three leg circuits 4u, 4v, and 4w are provided respectively corresponding to U phase, V phase, and W phase.

AC input terminals Nu, Nv, and Nw respectively provided for leg circuits 4u, 4v, and 4w are connected to AC power system 71 through a transformer 13. In FIG. 3, for simplification of illustration, the connection between AC input terminals Nv, Nw and transformer 13 is not shown.

High potential-side DC terminal Np and low potential-side DC terminal Nn connected in common to leg circuits 4 are connected to DC power grid 21.

AC power system 71 may be connected through an interconnecting reactor, instead of using transformer 13 in FIG. 3. Furthermore, instead of AC input terminals Nu, Nv, and Nw, leg circuits 4u, 4v, and 4w may be provided with respective primary windings, and leg circuits 4u, 4v, and 4w may be connected in terms of alternating current to transformer 13 or the interconnecting reactor through secondary windings magnetically coupled to the primary windings. In this case, the primary windings may be reactors 8A and 8B described below. Specifically, leg circuits 4 are electrically (that is, in terms of direct current or alternating current) connected to AC power system 71 through connections provided for leg circuits 4u, 4v, and 4w, such as AC input terminals Nu, Nv, and Nw or the primary windings.

Leg circuit 4u includes an upper arm 5 from high potential-side DC terminal Np to AC input terminal Nu and a lower arm 6 from low potential-side DC terminal Nn to AC input terminal Nu. AC input terminal Nu that is a connection point between upper arm 5 and lower arm 6 is connected to transformer 13. High potential-side DC terminal Np and low potential-side DC terminal Nn are connected to DC power grid 21. Leg circuits 4v and 4w have a similar configuration, and hereinafter the configuration of leg circuit 4u is explained as a representative example.

Upper arm 5 includes a plurality of converter cells 7 connected in cascade and a reactor 8A. Converter cells 7 and reactor 8A are connected in series. Similarly, lower arm 6 includes a plurality of converter cells 7 connected in cascade and a reactor 8B. Converter cells 7 and reactor 8B are connected in series.

Power converter 61 further includes an AC voltage detector 10, an AC current detector 16, DC voltage detectors 11A and 11B, and arm current detectors 9A and 9B provided for each leg circuit 4, as detectors for measuring the quantity of electricity (current, voltage, etc.) used in control. Signals detected by these detectors are input to control protective device 110.

In FIG. 3, the signal lines of signals input from the detectors to control protective device 110 and the signal lines of signals input and output between control protective device 110 and converter cells 7 are depicted partially collectively for the sake of ease of illustration, but, in actuality, they are provided individually for each detector and each converter cell 7. Signal lines between each converter cell 7 and control protective device 110 may be provided separately for transmission and reception. The signal lines are formed with, for example, optical fibers.

The detectors will now be specifically described.

AC voltage detector 10 detects U-phase AC voltage Vacu, V-phase AC voltage Vacv, and W-phase AC voltage Vacw of AC power system 71. AC current detector 16 detects U-phase AC current Iacu, V-phase AC current Iacv, and W-phase AC current Iacw of AC power system 71.

DC voltage detector 11A detects DC voltage Vdcp at high potential-side DC terminal Np connected to DC power grid 21. DC voltage detector 11B detects DC voltage Vdcn at low potential-side DC terminal Nn connected to DC power grid 21. DC current detector 17 detects DC current Idc flowing through high potential-side DC terminal Np or low potential-side DC terminal Nn.

Arm current detectors 9A and 9B provided in leg circuit 4*u* for U phase respectively detect upper arm current Ipu flowing through upper arm 5 and lower arm current Inu flowing through lower arm 6. Arm current detectors 9A and 9B provided in leg circuit 4*v* for V phase respectively detect upper arm current Ipv and lower arm current Inv. Arm current detectors 9A and 9B provided in leg circuit 4*w* for W phase respectively detect upper arm current Ipw and lower arm current Inw.

Figure 4:
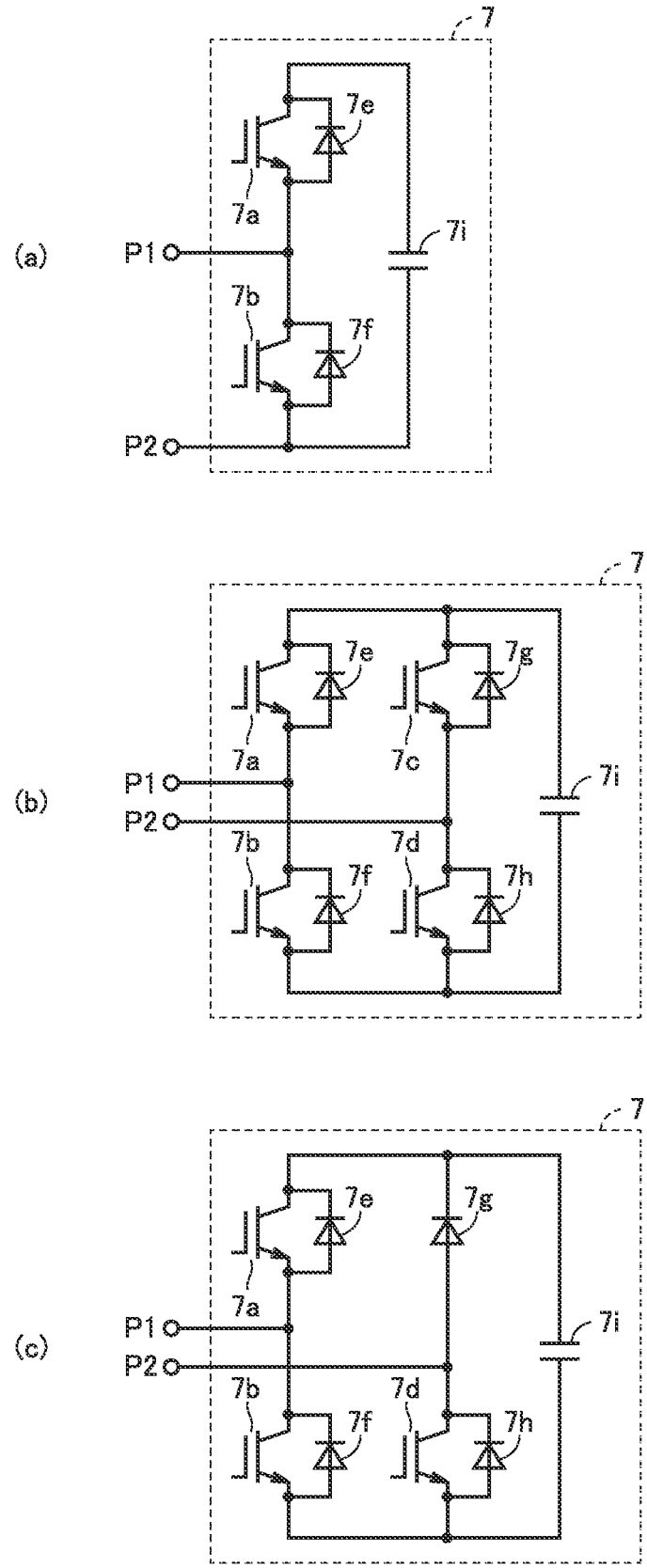
FIG. 4 is a diagram illustrating a configuration example of a converter cell in FIG. 3.

FIG. 4 is a diagram illustrating a configuration example of a converter cell in FIG. 3.

Converter cell 7 illustrated in FIG. 4(*a*) employs a half bridge configuration by way of example and includes semiconductor switching elements 7*a*, 7*b* (which hereinafter may be simply referred to as switching elements) connected in series with each other, diodes 7*e*, 7*f*, and a DC capacitor 7*i* as an energy accumulator. Diodes 7*e*, 7*f* are respectively connected in anti-parallel (in parallel and in reverse-bias direction) with switching elements 7*a*, 7*b*. DC capacitor 7*i* is connected in parallel with the series connection circuit of switching elements 7*a*, 7*b*. The connection node of switching elements 7*a* and 7*b* is connected to a positive-side input/output terminal P1, and the connection node of switching element 7*b* and DC capacitor 7*i* is connected to the negative-side input/output terminal P2.

In the configuration in FIG. 4(*a*), switching elements 7*a*, 7*b* are controlled such that one of them is in the on state and the other is in the off state. When switching element 7*a* is in the on state and switching element 7*b* is in the off state, a voltage between both ends of DC capacitor 7*i* (positive voltage at input/output terminal P1 and negative voltage at input/output terminal P2) is applied between input/output terminals P1 and P2. Conversely, when switching element 7*a* is in the off state and switching element 7*b* is in the on state, the voltage between input/output terminals P1 and P2 is 0 V. That is, converter cell 7 illustrated in FIG. 4(*a*) can output zero voltage or positive voltage (depending on the voltage at DC capacitor 7*i*) by alternately turning on switching elements 7*a*, 7*b*. Diodes 7*e*, 7*f* are provided for protection when a reverse voltage is applied to switching elements 7*a*, 7*b*.

Converter cell 7 illustrated in FIG. 4(*b*) employs a full bridge circuit by way of example and differs from converter cell 7 in FIG. 4(*a*) in that it further includes switching elements 7*c*, 7*d* connected in series and diodes 7*g*, 7*h* respectively connected in anti-parallel with switching elements 7*c*, 7*d*. The whole of switching elements 7*c*, 7*d* is connected in parallel with the series connection circuit of switching elements 7*a*, 7*b* and connected in parallel with DC capacitor 7*i*. Input/output terminal P1 is connected to the connection node of switching elements 7*a*, 7*b*, and input/output terminal P2 is connected to the connection node of switching elements 7*c*, 7*d*.

Converter cell 7 illustrated in FIG. 4(*b*) is controlled such that in normal operation (that is, zero voltage or positive voltage is output between input/output terminals P1 and P2), switching element 7*d* is always turned on, switching element 7*c* is always turned off, and switching elements 7*a*, 7*b* are alternately turned on. However, converter cell 7 illustrated in FIG. 4(*b*) can also output zero voltage or negative voltage by turning off switching element 7*d*, turning on switching element 7*c*, and alternately turning on switching elements 7*a*, 7*b*.

Converter cell 7 illustrated in FIG. 4(*c*) has a configuration in which switching element 7*c* is removed from converter cell 7 having a full bridge configuration illustrated in FIG. 4(*b*) and is the same as in FIG. 4(*b*) in other respects. Converter cell 7 illustrated in FIG. 4(*c*) is controlled such that in normal operation (that is, zero voltage or positive voltage is output between input/output terminals P1 and P2), switching element 7*d* is always turned on and switching elements 7*a*, 7*b* are alternately turned on. Converter cell 7 illustrated in FIG. 4(*c*) can also output negative voltage when switching elements 7*a*, 7*d* are turned off, switching element 7*b* is turned on, and current flows in a direction from input/output terminal P2 toward input/output terminal P1.

Switching elements 7*a*, 7*b*, 7*c*, 7*d* are self-turn-off switching elements in which both ON operation and OFF operation can be controlled. For example, insulated gate bipolar transistors (IGBTs) or gate commutated turn-off thyristors (GCTs) are used as switching elements 7*a*, 7*b*, 7*c*, 7*d*.

[Configuration Example of Individual Control Protective Device]

Figure 5:
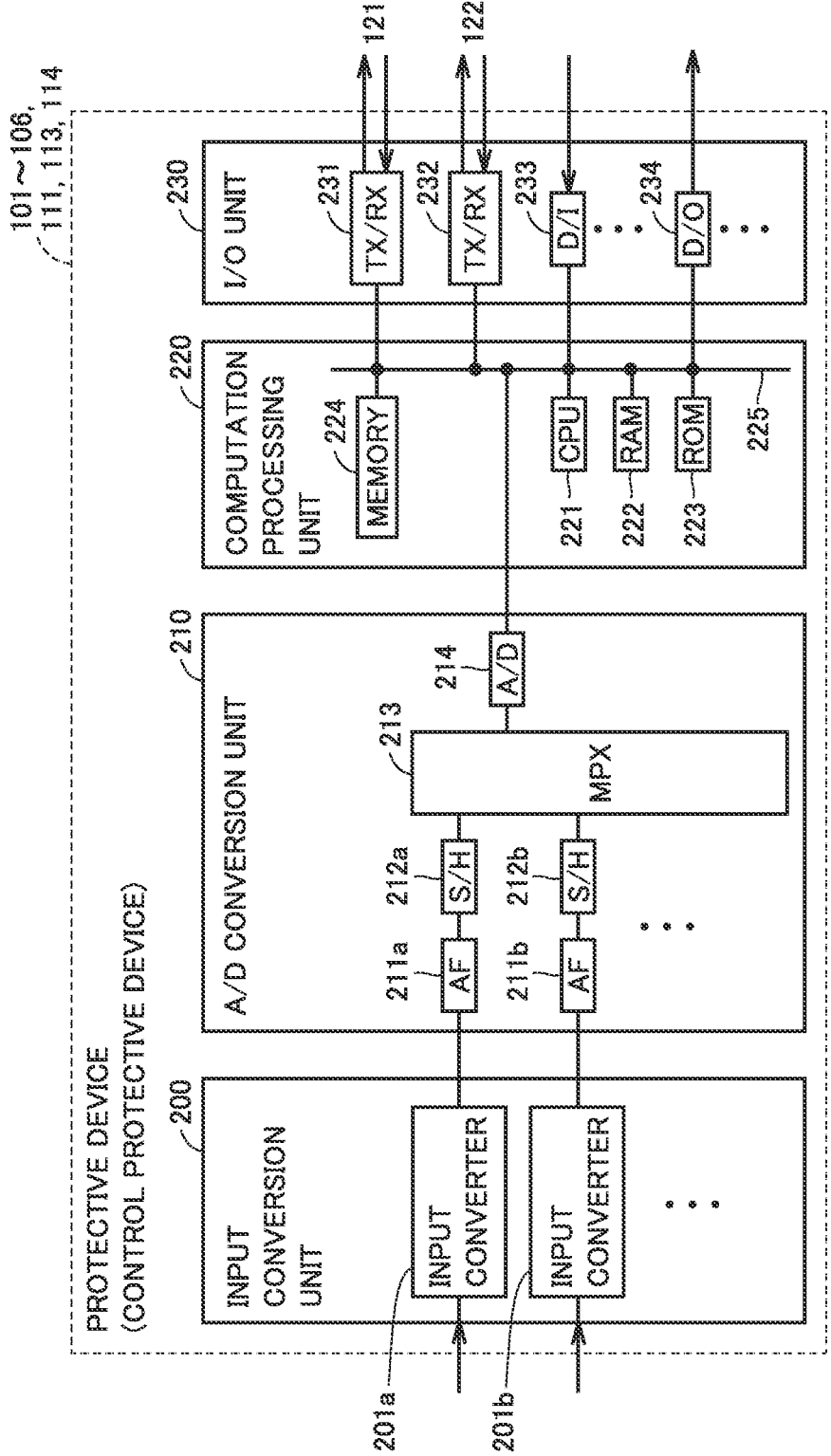
FIG. 5 is a diagram illustrating an exemplary hardware configuration of a control protective device, a bus protective device, and a transmission line protective device in FIG. 2.

FIG. 5 is a diagram illustrating an exemplary hardware configuration of a control protective device, a bus protective device, and a transmission line protective device in FIG. 2. Protective devices 101 to 106 and control protective devices 110, 113, 116 have a similar configuration. In the following, bus protective device 101 will be described as a representative example.

Referring to FIG. 5, bus protective device 101 includes an input conversion unit 200, an A/D conversion unit 210, a computation processing unit 220, and an input/output unit (I/O unit) 230.

Input conversion unit 200 is an input unit receiving a current signal of each circuit output from DC current detector 81, 83 in FIG. 2. Input conversion unit 200 has input converter 201*a*, 201*b*, . . . , for each channel. A current signal of each circuit is input to the corresponding channel (FIG. 5 illustrates only two channels as representative examples). Each input converter 201*a*, 201*b* converts a current signal from DC current detector 81, 83 into a signal at a voltage level suitable for signal processing in A/D conversion unit 210 and computation processing unit 220.

A/D conversion unit 210 includes an analog filter (AF) 211, a sample and hold circuit (S/H) 212, a multiplexer (MPX) 213, and an analog-to-digital (A/D) converter 214. Each analog filter 211 (211*a*, 211*b*, . . . ) and each sample and hold circuit 212 (212*a*, 212*b*, . . . ) are provided for each channel corresponding to one of input converters 201 (201*a*, 201*b*, . . . ).

Each analog filter 211 is a filter provided for removing an aliasing error in A/D conversion. Each sample and hold circuit 212 samples and holds a signal passing through the corresponding analog filter 211 at a prescribed sample rate (also referred to as sampling frequency). Multiplexer 213 successively selects a voltage signal held by each sample and hold circuit 212. A/D converter 214 converts a signal selected by the multiplexer into a digital value.

Computation processing unit 220 includes a central processing unit (CPU) 221, a random access memory (RAM) 222, a read only memory (ROM) 223, and an electrically-rewritable nonvolatile memory 224 such as a flash memory. These elements are connected to each other through a bus 225. RAM 222 and ROM 223 are used as main memories for CPU 221. CPU 221 controls the operation of the entire bus protective device 101 under instructions of a program stored in ROM 223 and nonvolatile memory 224.

Input/output unit 230 includes a communication circuit (TX/RX) 231 for performing communication via high-speed communication network 121 and a communication circuit 232 for performing communication via standard communication network 122. Input/output unit 230 further includes a digital input (D/I) circuit 233 and a digital output (D/O) circuit 234. Digital input circuit 233 is an interface circuit for receiving a signal output from an output device, and digital output circuit 234 is an interface circuit for outputting a signal to an external device. For example, digital output circuit 234 outputs a trip signal to the corresponding circuit breaker 41, 42.

[Operation Principle of Current Differential Relay Element and Directional Rate of Change of Current Relay Element]

The operation principle of the current differential relay element and the directional rate of change of current relay element that are functions of bus protective devices 101, 102 will be described below.

Figure 6:
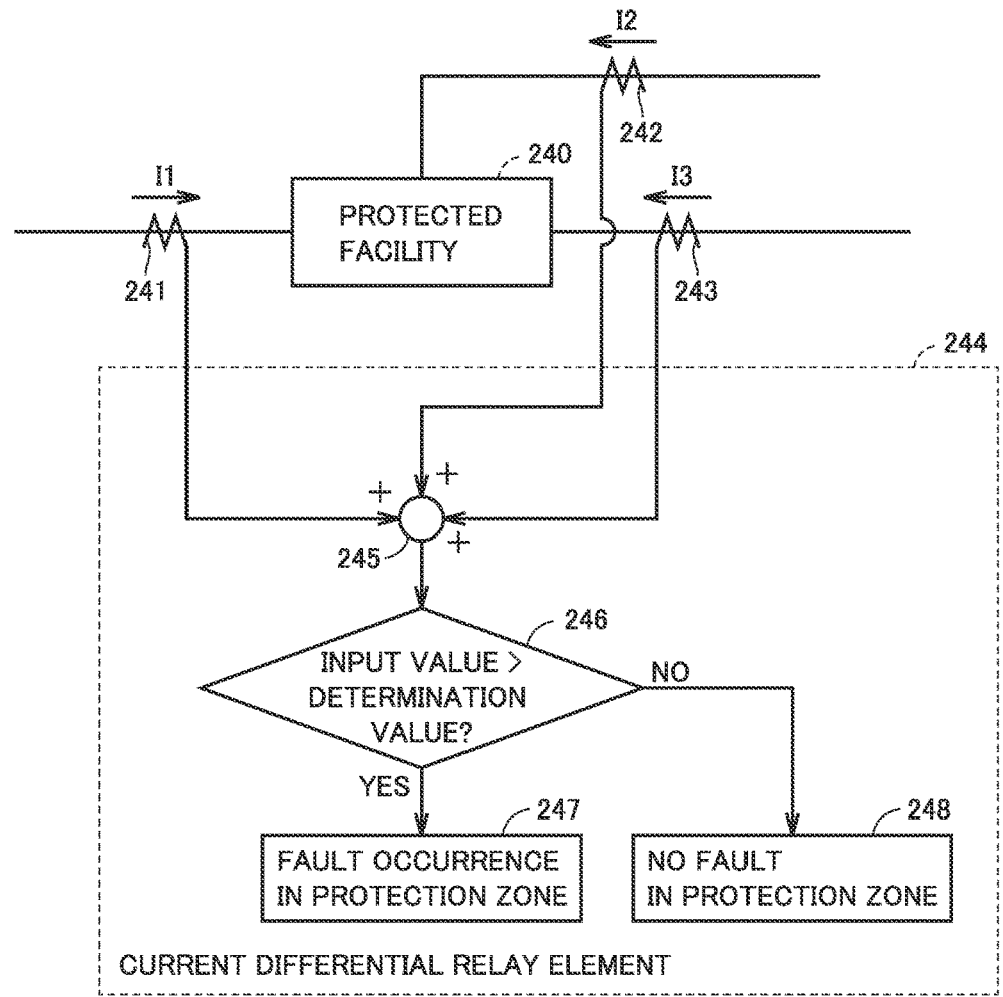
FIG. 6 is a diagram for explaining the operation principle of a current differential relay element.

FIG. 6 is a diagram for explaining the operation principle of a current differential relay element.

Referring to FIG. 6, three-circuit DC transmission lines are connected to a protected facility 240 protected by a current differential relay element 244. DC current detectors 241, 242, 243 are provided corresponding to three-circuit DC transmission lines. Current differential relay element 244 receives signals indicating DC currents I1, I2, I3 detected by DC current detectors 241, 242, 243, respectively. The positive direction of DC currents I1, I2, I3 is the direction current flows into protected facility 240.

Current differential relay element 244 includes an adder 245 and a comparator 246. Adder 245 adds the values of DC currents I1, I2, I3 detected by DC current detectors 241, 242, 243, respectively. Comparator 246 determines whether an input value that is an addition result of adder 245 is greater than a predetermined determination value. When the input value is greater than the determination value, comparator 246 outputs a fault detection signal 247 indicating that a fault is occurring in the protection zone including protected facility 240. On the other hand, when the input value is not greater than the determination value, comparator 246 outputs a signal 248 indicating that a fault is not occurring in the protection zone including protected facility 240.

Figure 7:
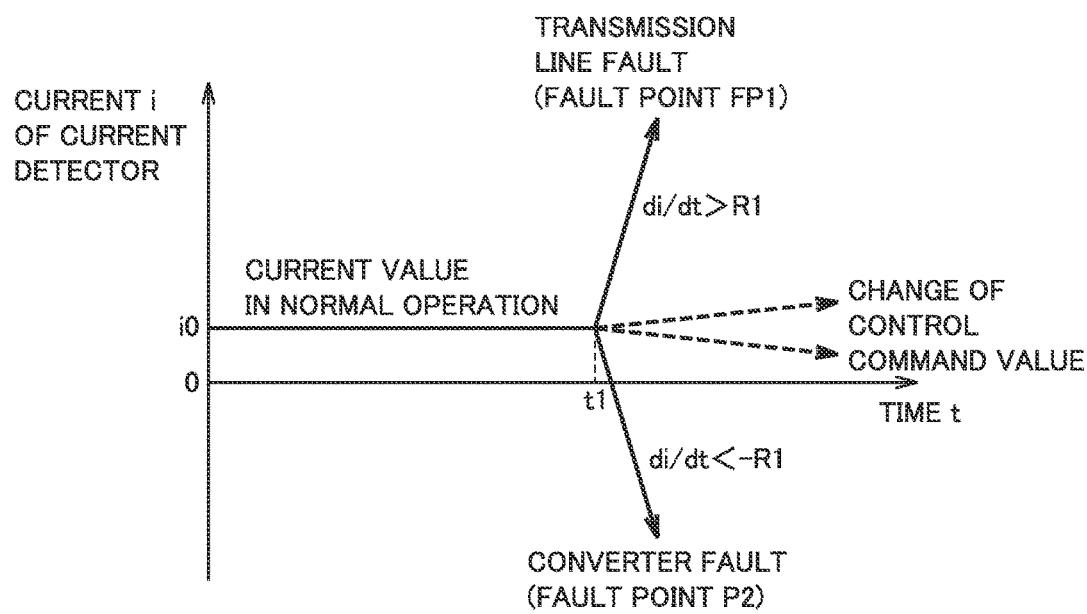
FIG. 7 is a diagram for explaining the operation of a directional rate of change of current relay element.

FIG. 7 is a diagram for explaining the operation of a directional rate of change of current relay element. In FIG. 7, temporal change of current i detected by DC current detector 84 in FIG. 2 is illustrated by way of example. A current value in normal operation is i0. Current in a direction from DC bus 31 toward DC transmission line 22 is positive.

Referring to FIG. 2 and FIG. 7, it is assumed that a fault occurs at a fault point FP1 on DC transmission line 22 at time t1. In this case, when faulty current flows in a direction from DC bus 31 toward fault point FP1, the rate of change di/dt of detection current i is positive and the absolute value of the rate of change exceeds a determination value R1. The absolute value of the rate of change di/dt of detection current i is far greater than the absolute value of the rate of change of load current when a control command value is changed.

It is assumed that a fault occurs at a fault point FP2 in power converter 62 at time t1. In this case, when faulty current flows in a direction from DC bus 31 toward fault point FP2, the rate of change di/dt of detection current i is negative and the absolute value of the rate of change exceeds the determination value R1. The absolute value of the rate of change di/dt of detection current i is far greater than the absolute value of the rate of change of load current when a control command value is changed.

As described above, the directional rate of change of current relay element can detect the direction in which faulty current flows, based on the sign of the rate of change of detection current and the absolute value of the rate of change. A directional magnitude of change of current relay element may be used instead of the directional rate of change of current relay element.

[Configuration Example of Common Control Device]

Figure 8:
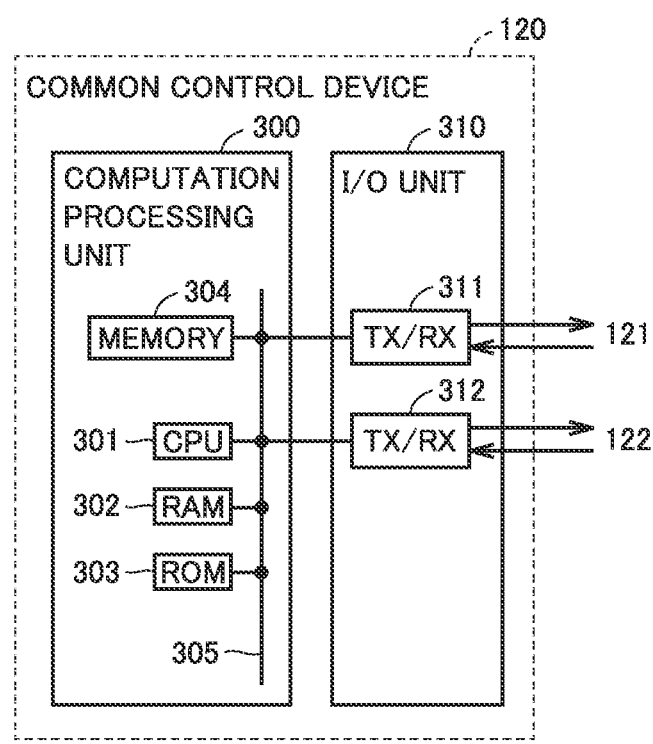
FIG. 8 is a diagram illustrating an exemplary hardware configuration of a common control device.

FIG. 8 is a diagram illustrating an exemplary hardware configuration of the common control device.

Referring to FIG. 8, common control device 120 includes a computation processing unit 300 and an input/output unit (I/O unit) 310.

Computation processing unit 300 includes a CPU 301, a RAM 302, a ROM 303, and an electrically-rewritable nonvolatile memory 304 such as a flash memory. These elements are connected to each other through a bus 305. RAM 302 and ROM 303 are used as main memories for CPU 301. CPU 301 controls the operation of the entire common control device 120 under instructions of a program stored in ROM 303 and nonvolatile memory 304.

Input/output unit 310 includes a communication circuit (TX/RX) 311 for performing communication via high-speed communication network 121 and a communication circuit 312 for performing communication via standard communication network 122.

[Operation of Multi-Terminal DC Power Transmission System]

Figure 9:
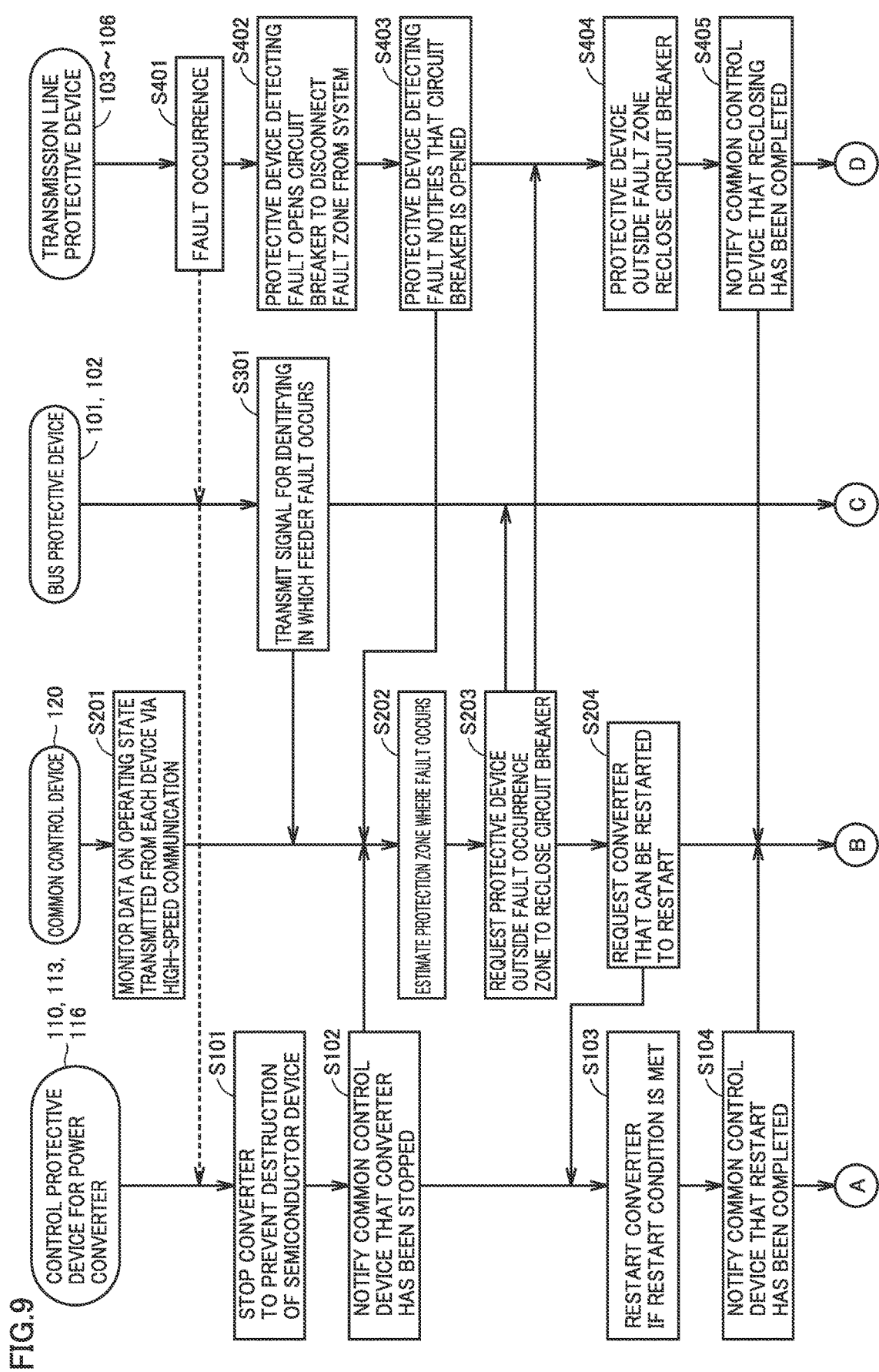
FIG. 9 is a flowchart (1) for explaining the operation of the multi-terminal DC power transmission system.
Figure 10:
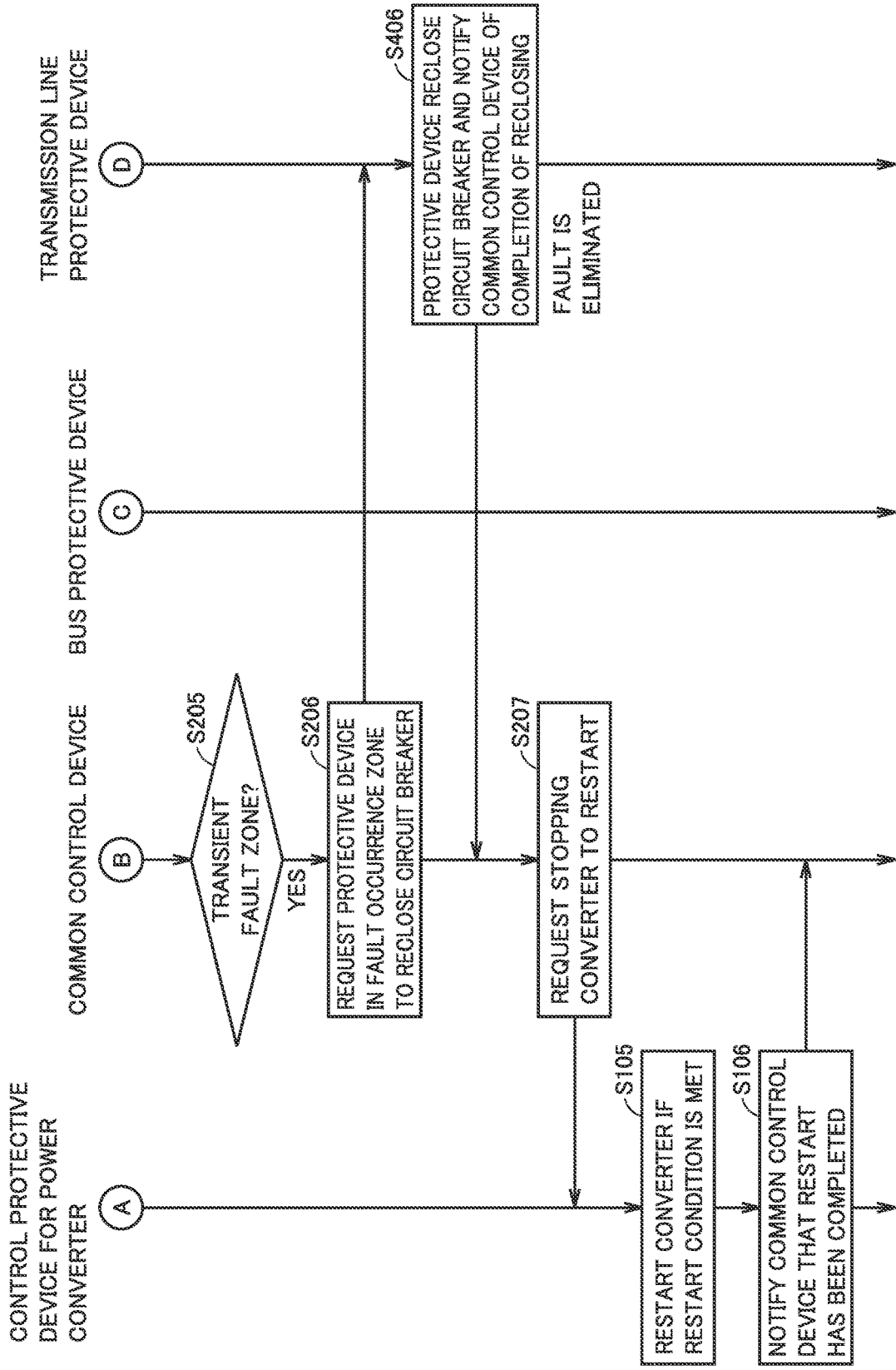
FIG. 10 is a flowchart (2) for explaining the operation of the multi-terminal DC power transmission system.
Figure 11:
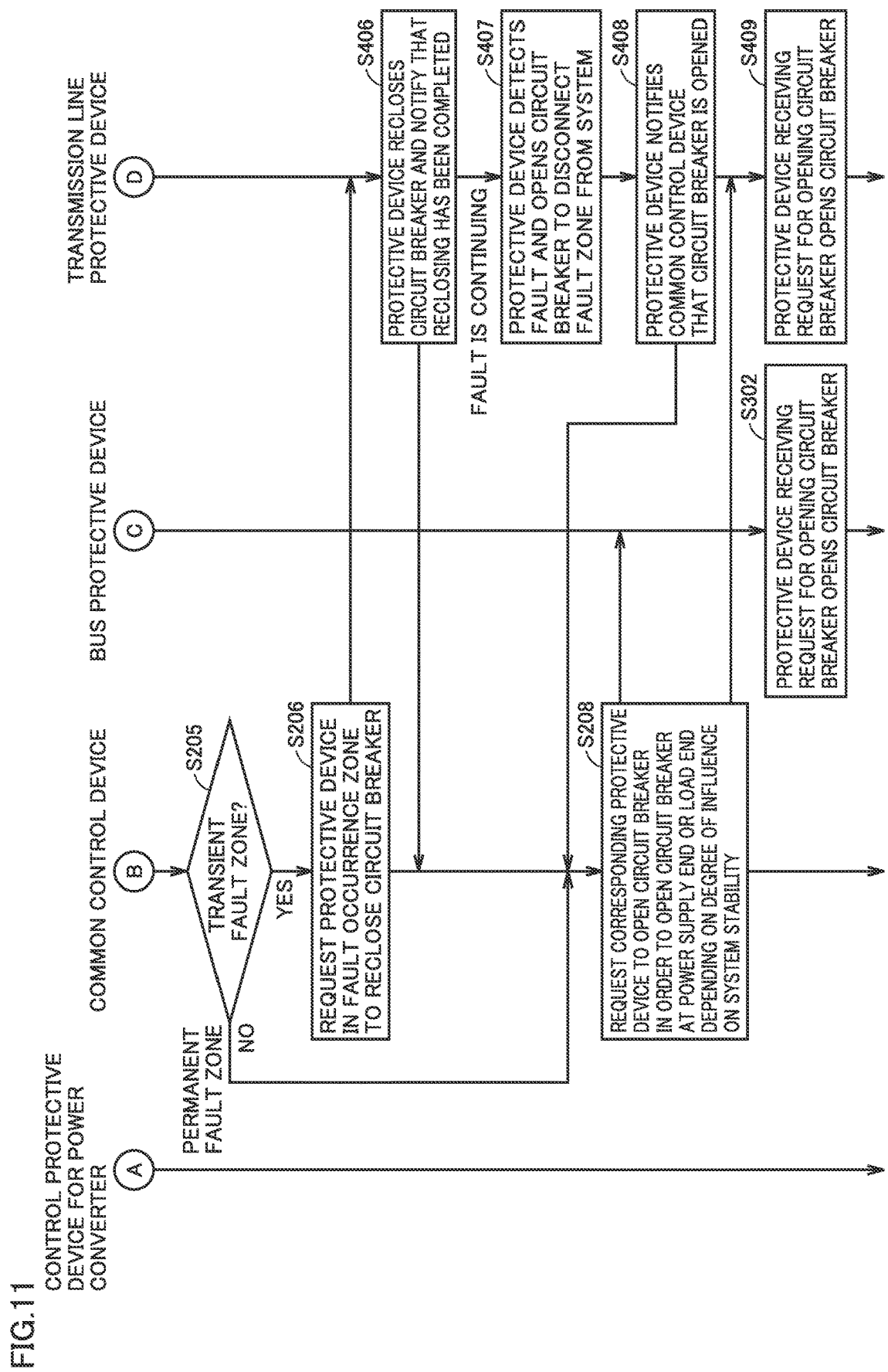
FIG. 11 is a flowchart (3) for explaining the operation of the multi-terminal DC power transmission system.

FIG. 9 to FIG. 11 are flowcharts for explaining the operation of the multi-terminal DC power transmission system. The flowchart in FIG. 9 illustrates the procedure from occurrence of a fault on a DC transmission line to recovery of a deenergized healthy protection zone other than a fault occurrence zone. The flowcharts in FIG. 10 and FIG. 11 illustrate reclosing of the fault occurrence zone and the subsequent procedure.

The flowchart in FIG. 10 and the flowchart in FIG. 11 correspond to each other. The flowchart in FIG. 10 illustrates the procedure in a case where a fault in a fault occurrence zone has been eliminated after reclosing is performed a certain time after fault occurrence, in a protection zone assumed to have a transient fault, such as an overhead transmission line. On the other hand, the flowchart in FIG. 11 illustrates the procedure in a case where a fault is continuing in a fault occurrence zone after reclosing and a case where a fault occurs in a protection zone assumed to have a permanent fault, such as an underground transmission line. The operation of multi-terminal DC power transmission system 20 will be described below with reference to the configuration example of multi-terminal DC power transmission system 20 in FIG. 2 and the flowcharts in FIG. 9 to FIG. 11.

At step S201 in FIG. 9, common control device 120 communicates with bus protective devices 101, 102, transmission line protective devices 103 to 106, and control protective devices 110, 113, 116 via high-speed communication network 121 to receive operation information at high speed from the devices. In this way, common control device 120 always monitors the state of multi-terminal DC power transmission system 20.

At the next step S401, a fault occurs at any one of DC transmission lines. Upon occurrence of a fault, at the next step S402, the transmission line protective device in the fault occurrence zone detects the fault and outputs a trip signal to the corresponding circuit breaker to open the circuit breaker. The fault occurrence zone is thus disconnected from multi-terminal DC power grid 21.

In multi-terminal DC power grid 21 with a high fault propagation speed, a fault may be detected by each individual protective device in a healthy protection zone near the fault occurrence zone. In this case, at step S402, the individual protective device detecting a fault in a healthy protection zone outputs a trip signal to the corresponding circuit breaker to open the circuit breaker. The healthy protection zone where a fault is detected is thus disconnected from multi-terminal DC power grid 21 and deenergized.

At the next step S403, the individual protective device detecting a fault outputs a fault detection signal (also referred to as a fault signal) to common control device 120. The fault detection signal includes information on the DC circuit breaker that has been opened to disconnect the corresponding protection zone from multi-terminal DC power grid 21. Furthermore, a communication packet issued for transmitting the fault detection signal includes a timestamp indicating the fault detection time.

If a fault occurs on a DC transmission line (step S401), any of power converters 61, 62, 65 may be further stopped. For example, when a fault of a DC transmission line occurs in proximity to a power converter, or when DC reactors for suppressing faulty current are not sufficiently inserted in a power converter, fault current which is large for the converter flows. In order to prevent destruction of semiconductor devices due to this faulty current, the power converter need to be stopped. In the example in FIG. 9, at step S101, any of control devices 111, 114, 117, protective devices 112, 115, 118, or the protection function installed in power converters 61, 62, 65 stop the operation of the corresponding power converter 61, 62, 65, in response to detection of faulty current.

At the next step S102, control device 111, 114, 117 or protective device 112, 115, 118 outputs a fault detection signal to common control device 120. The fault detection signal includes information that the corresponding power converter 61, 62, 65 has been stopped. A communication packet issued for transmitting the fault detection signal includes a timestamp indicating the fault detection time.

The timestamp attached to the communication packet including the fault detection signal is premised on that the time is synchronized in bus protective devices 101, 102, transmission line protective devices 103 to 106, and control protective devices 110, 113, 116. A variety of methods can be employed for time synchronization. For example, each individual control protective device and common control device 120 may be connected to a network to which a network time protocol (NTP) server transmitting information on the present time is connected so that time synchronization is performed in each device based on a time synchronization signal received from the NTP server. Alternatively, common control device 120 may transmit a common time synchronization signal to each individual control protective device. In this case, common control device 120 may be provided with a GPS receiver.

If a fault occurs on a DC transmission line (step S401), bus protective device 101, 102 provided in a bus protection zone near the fault point can further detect faulty current and its direction. At step S301, bus protective device 101, 102 transmits to common control device 120 a fault detection signal including information indicating on which feeder line connected to the corresponding DC bus 30, 31 the fault has occurred. A communication packet issued for transmitting the fault detection signal includes a timestamp indicating the time when faulty current is detected.

Common control device 120 receives the fault detection signals transmitted at steps S102, S403 above and the fault detection signal (including information on the direction of faulty current) transmitted at step S301 above, via high-speed communication network 121. Subsequently, at step S202, common control device 120 estimates a fault occurrence zone, based on the fault detection signals with a timestamp. More specifically, common control device 120 can estimate a fault occurrence zone, based on the arrangement position of a protective device with the earliest fault detection time and information on the direction of faulty current that is received from each bus protective device (that is, information as to on which feeder line faulty current flows out).

At the next step S203, common control device 120 requests reclosing from the corresponding individual protective device in order to reclose a DC circuit breaker opened upon occurrence of a fault, other than the DC circuit breaker for disconnecting the estimated fault occurrence zone from multi-terminal DC power grid 21.

At step S404, the individual protective device receiving the reclosing request from common control device 120 recloses the corresponding DC circuit breaker. At the next step S405, the individual protective device transmits a signal indicating that reclosing has been completed to common control device 120.

If there is any protection zone where a fault is continuing after reclosing, the individual protective device provided in such a protection zone opens the corresponding DC circuit breaker again. In this case, common control device 120 estimates a fault occurrence zone again in accordance with the procedure described above.

Before or after step S203 above, at step S204, common control device 120 extracts a power converter that can be restarted other than the power converter connected to the estimated fault occurrence zone and requests the control device of the extracted power converter to restart.

The control device for the power converter receiving the restart request checks if the restart condition for the corresponding power converter is met at step S103 and, if the restart condition is met, restarts the corresponding power converter. When the power converter is composed of a modular multilevel converter described with reference to FIG. 3 and FIG. 4, the restart condition includes, for example, a condition that the charging voltage of the DC capacitor included in each converter cell reaches a prescribed voltage value.

If a condition necessary for operation is satisfied, the control device for the power converter may restart the corresponding power converter at its own discretion rather than based on a request from common control device 120. The condition necessary for operation includes, for example, a condition that the DC voltage value of multi-terminal DC power grid 21 has returned to a value in normal operation.

At the next step S104, the control device for the power converter notifies common control device 120 that the corresponding power converter has been restarted.

Referring now to FIG. 10 and FIG. 11, reclosing of a fault occurrence zone and a subsequent procedure will be described. First, common control device 120 determines whether the fault occurrence zone is a permanent fault zone or a transient fault zone (step S205 in FIG. 10 and FIG. 11). The permanent fault zone means that, for example, a transmission line in the zone is underground. The transient fault zone means that, for example, a transmission line in the zone is overhead.

If the fault occurrence zone is a permanent fault zone (NO at step S205), reclosing of a circuit breaker in the fault occurrence zone is not performed. On the other hand, if the fault occurrence zone is a transient fault zone (YES at step S205), at step S206 in FIG. 10 and FIG. 11, common control device 120 waits until the time required for fault elimination has passed and then requests the transmission line protective device provided in the fault occurrence zone to reclose the corresponding DC circuit breaker.

At step S406 in FIG. 10 and FIG. 11, the transmission line protective device in the fault occurrence zone receiving the request for reclosing recloses the corresponding DC circuit breaker and transmits a signal indicating the reclosing has been completed to common control device 120.

As illustrated in FIG. 10, if a fault has been eliminated after reclosing and the transmission line protective device does not detect a fault, at step S207, common control device 120 requests the control device for the stopped power converter to restart.

The control device for the power converter receiving the request for restarting checks if the restart condition for the corresponding power converter is met at step S105 and, if the restart condition is met, restarts the corresponding power converter. At the next step S106, the control device receiving the request for restarting notifies common control device 120 that the corresponding power converter has been restarted.

On the other hand, as illustrated in FIG. 11, if the transmission line fault is continuing even after reclosing, at step S407, the transmission line protective device in the fault occurrence zone detects the fault and outputs a trip signal to the corresponding circuit breaker to open the circuit breaker. The fault occurrence zone is thus disconnected from multi-terminal DC power grid 21. At the next step S408, the transmission line protective device in the fault occurrence zone notifies common control device 120 that the corresponding circuit breaker has been opened.

If a transmission line fault is detected again after reclosing, the circuit breaker may be temporarily opened and thereafter reclosed again. If the transmission line fault fails to be eliminated, reclosing of the circuit breaker and opening of the circuit breaker may be repeated multiple times until the fault is eliminated. In this case, if the transmission line fault fails to be eliminated even through reclosing is repeated a predetermined number of times or if the transmission line fault fails to be eliminated even after a predetermined time has passed since the initial fault detection, the transmission line protective device keeps the corresponding circuit breaker in the open state without performing reclosing again.

If a fault propagates to a healthy zone other than the fault occurrence zone after reclosing and the fault is detected in a plurality of individual protective devices, the procedure subsequent to step S401 in FIG. 9 is repeated again.

If common control device 120 determines that the fault occurrence zone is a permanent fault zone at step S205 or receives a notification that the circuit breaker is kept open from the transmission line protective device in the fault occurrence zone (step S408), the process proceeds to step S208.

At step S208, common control device 120 assesses how much the disconnection of the fault occurrence zone from multi-terminal DC power grid 21 affects the balance between the power supply from a power source and the power consumption by a load. If the DC circuit breaker connected to a power supply end or a load end need to be opened in order to keep the balance between the power supply and the power consumption, common control device 120 requests the protective device associated with the DC circuit breaker to open the DC circuit breaker.

At step S302, the bus protective device receiving the request for opening the DC circuit breaker outputs a trip signal for opening the DC circuit breaker. Similarly, at step S409, the transmission line protective device receiving the request for opening the DC circuit breaker outputs a trip signal for opening the DC circuit breaker.

Effects of First Embodiment

As described above, multi-terminal DC power transmission system 20 of the first embodiment includes multi-terminal DC power grid 21 including a plurality of protection zones, each protection zone being divided from an adjacent protection zone by a DC circuit breaker, a plurality of individual protective devices provided corresponding to the protection zones, and common control device 120 connected to the individual protective devices via high-speed communication network 121. When abnormality of the quantity of electricity (that is, change in voltage or current) due to fault occurrence in any of the protection zones is detected in the corresponding protection zone, each of the individual protective devices outputs a fault signal pertaining to fault occurrence to high-speed communication network 121 and opens a DC circuit breaker that divides the corresponding protection zone such that the corresponding protection zone is disconnected from multi-terminal DC power grid 21 and deenergized. Common control device 120 estimates a fault occurrence zone where a fault occurs among the protection zones, based on the received fault signals, and requests the individual protective device corresponding to the deenergized protection zone to reclose the DC circuit breaker that divides the deenergized protection zone such that the deenergized protection zone other than the fault occurrence zone is restored.

The configuration of multi-terminal DC power transmission system 20 described above can shorten the de-energization duration of a healthy protection zone in connection with fault occurrence in multi-terminal DC power transmission system 20 in which a fault propagation range is spreading fast due to low system impedances. Therefore, a feasible and reliable system can be provided.

Second Embodiment

Possible network configurations between each protective device and common control device 120 include a configuration in which high-speed communication network 121 dedicated to fault processing in multi-terminal DC power transmission system 20 is provided as illustrated in FIG. 2 and a configuration in which a general-purpose high-speed communication network is provided. In a second embodiment, the communication schemes in these network configurations will be described. In either network configuration, the communication scheme described below can be used to implement high-speed communication between each protective device and common control device 120.

[Configuration Having High-Speed Communication Network Dedicated to Multi-Terminal DC Power Transmission System]

As previously mentioned, multi-terminal DC power transmission system 20 in FIG. 2 includes high-speed communication network 121 dedicated to fault processing in multi-terminal DC power transmission system 20 and standard communication network 122 for performing normal communication that is not speed demanding. High-speed communication network 121 only transmits a signal pertaining to protection of multi-terminal DC power transmission system 20. In the following, an example of the communication scheme in high-speed communication network 121 in FIG. 2 will be described.

Figure 12:
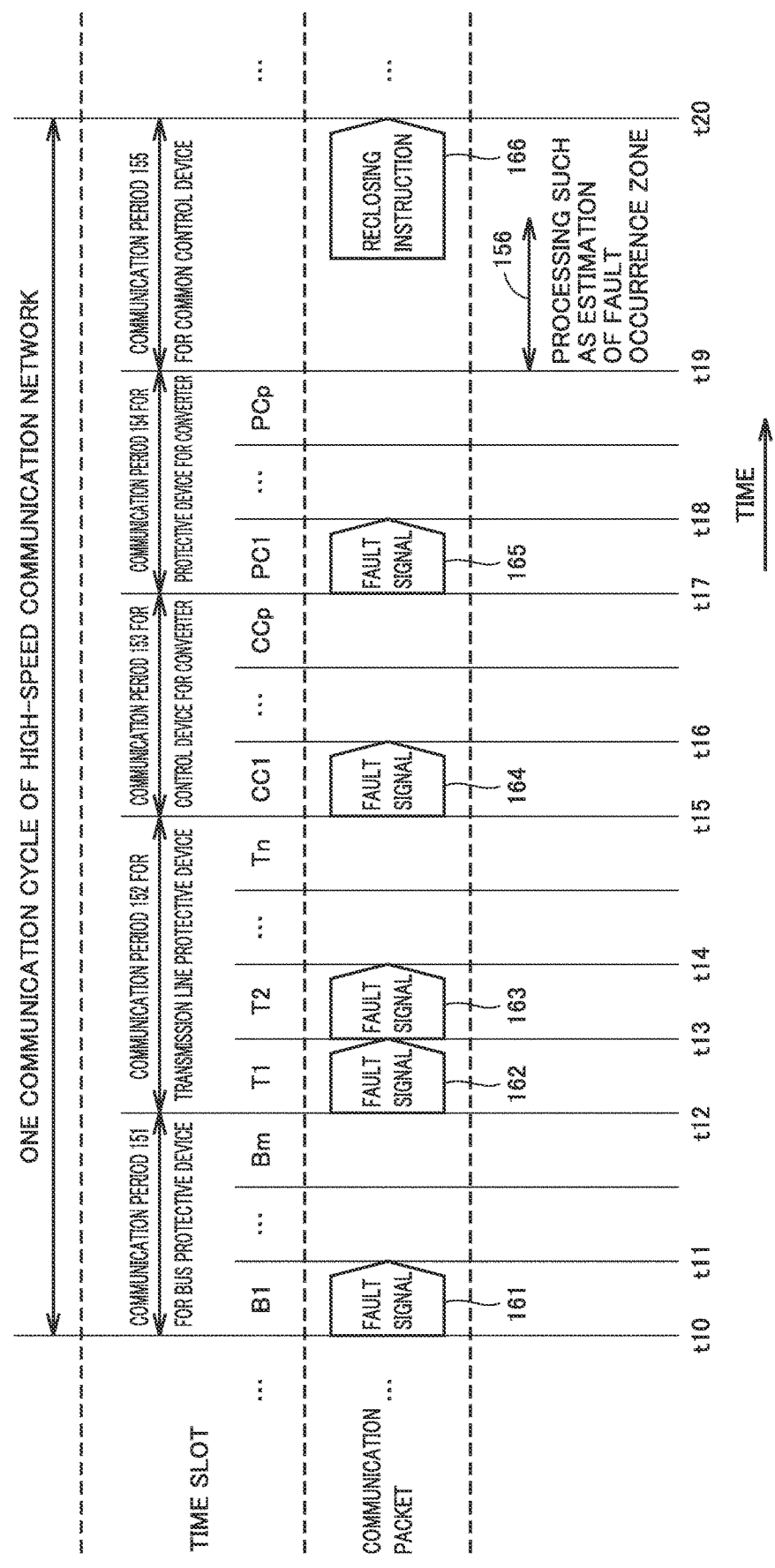
FIG. 12 is a timing chart illustrating an exemplary communication scheme in a high-speed communication network in FIG. 2.

FIG. 12 is a timing chart illustrating an exemplary communication scheme in a high-speed communication network in FIG. 2. In the example illustrated in FIG. 12, multi-terminal DC power transmission system 20 includes m bus protective devices B1, B2, . . . , Bm, n transmission line protective devices T1, T2, . . . , Tn, p control devices CC1, CC2, . . . , CCp for power converters, p protective devices PC1, PC2, . . . , PCp for power converters, and one common control device.

Time division multiplex communication is employed as a communication scheme in high-speed communication network 121. This ensures that communication between devices is completed within a prescribed time.

As illustrated in FIG. 12, in a time division multiplex communication scheme, one communication cycle of high-speed communication network 121 from time t10 to time t20 is divided into a plurality of time slots. The time slots are allocated to bus protective devices B1, . . . , Bm, transmission line protective devices T1, . . . , Tn, control devices CC1, . . . , CCp for power converters, protective devices PC1, . . . , PCp for power converters, and the common control device.

Specifically, in the example in FIG. 12, a communication period 151 for bus protective devices is a period from time t10 to time t12. A communication period 152 for transmission line protective devices is a period from time t12 to time t15. A communication period 153 for control devices for power converters is a period from time t15 to time t17. A communication period 154 for protective devices for power converters is a period from time t17 to time t19. A communication period 155 for the common control device is a period from time t19 to time t20.

An individual control protective device detecting a fault of the corresponding protection zone or power conversion device issues a communication packet in its allocated time slot to transmit fault information to the common control device.

Specifically, in the example in FIG. 12, bus protective device B1 transmits a communication packet 161 including a fault signal to the common control device in a time slot from time t11 to time t12. Transmission line protective device T1 transmits a communication packet 162 including a fault signal to the common control device in a time slot from time t12 to time t13. Transmission line protective device T2 transmits a communication packet 163 including a fault signal to the common control device in a time slot from time t13 to time t14. Control device CC1 for power converter transmits a communication packet 164 including a fault signal to the common control device in a time slot from time t15 to time t16. Protective device PC1 for power converter transmits a communication packet 165 including a fault signal to the common control device in a time slot from time t17 to time t18.

The common control device receiving a communication packet including fault information from each individual control protective device performs processing such as estimation of a fault occurrence zone in a period 156. The common control device then transmits a communication packet 166 including a reclosing instruction to each individual protective device provided in a deenergized protection zone other than the estimated fault occurrence zone, in a time slot from time t19 to time t20. The common control device may broadcast the communication packet 166 including a reclosing instruction, using broadcasting communication or multicasting communication targeted only for transmission line protective devices.

FIG. 13 is a diagram illustrating a configuration example of a communication packet including a fault signal and a communication packet including a reclosing instruction explained in FIG. 12.

Referring to FIG. 13(A), communication packets 161 to 165 in FIG. 12 including fault signals each include a head flag 170, a header 171, a timestamp 172, a fault signal 173, and a frame check sequence (FCS) 174. Timestamp 172 and fault signal 173 correspond to data body excluding supplemental information (that is, payload).

Referring to FIG. 13(B), communication packet 166 in FIG. 12 including a reclosing instruction includes a head flag 170, a header 171, a reclosing instruction 175, and an FCS 174. Reclosing instruction 175 corresponds to the payload.

In this way, since only the data indicating a fault detection signal, a timestamp, and a reclosing instruction corresponds to the payload, the allocation time of each time slot can be minimized. The response time from fault detection to reclosing instruction therefore can be shortened. Communication data in the syntax in conformity with ASN.1 (Abstract Syntax Notation One) employed in process buses is not desirable because it contains labels indicative of data structures and data types, leading to longer communication time and poor latency. For this reason, the syntax in conformity with ASN.1 (Abstract Syntax Notation One) is not implemented in the communication packets in the present embodiment.

When a network with a sufficiently high transmission rate (for example, 10 GBase-T) is used and a communication time (time slot) can be sufficiently reduced by minimizing the number of objects that constitute the payload, communication data in the syntax in conformity with ASN.1 may be used.

[Configuration Having General-Purpose High-Speed Communication Network]

An example of the communication scheme in a configuration in which only the general-purpose high-speed communication network 121 is provided (that is, standard communication network 122 is not provided) in multi-terminal DC power transmission system 20 in FIG. 2 will now be described.

Figure 14:
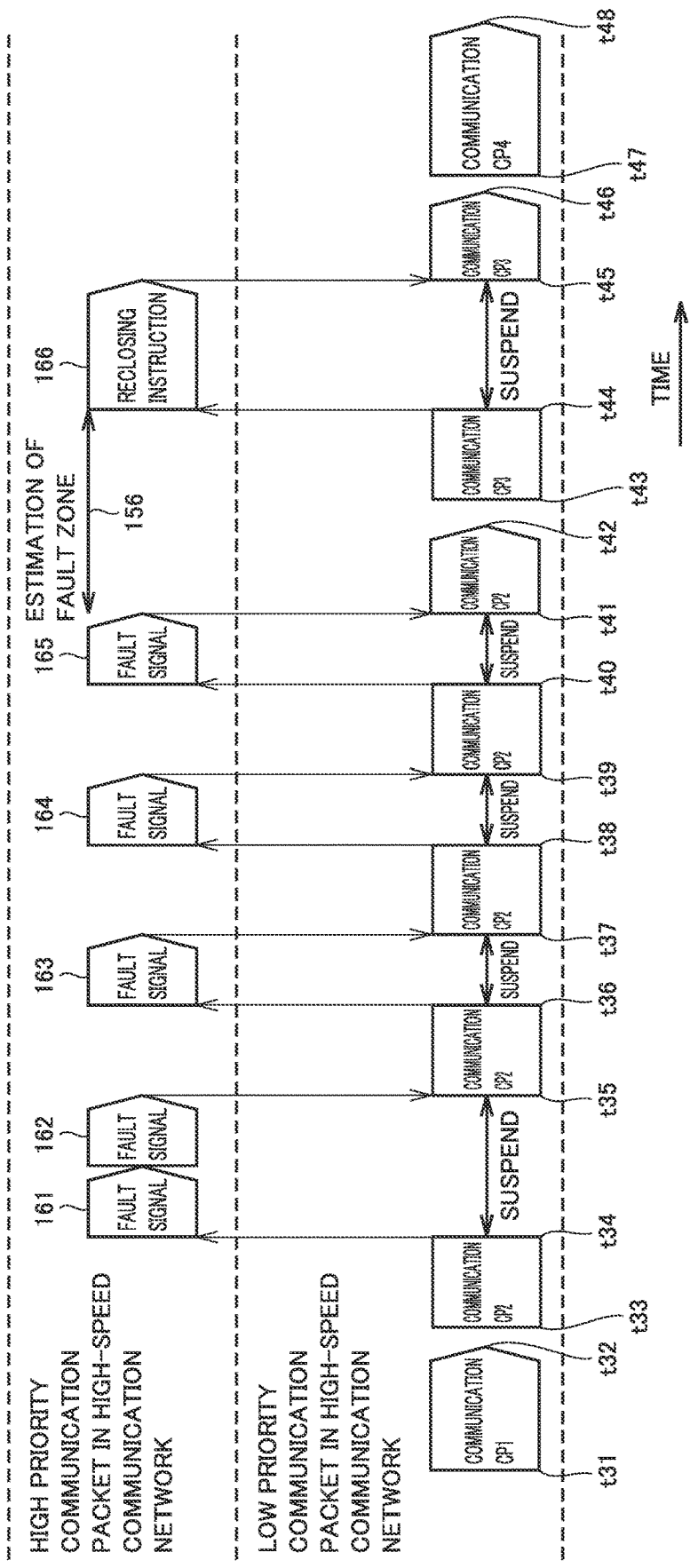
FIG. 14 is a timing chart illustrating an exemplary communication scheme used in a general-purpose high-speed communication network.

FIG. 14 is a timing chart illustrating an exemplary communication scheme used in a general-purpose high-speed communication network. In a general-purpose high-speed communication network, both of communication packets pertaining to processing at the time of a fault in multi-terminal DC power transmission system 20 and communication packets at other normal times are transmitted.

FIG. 14 illustrates an example in which, in a multi-terminal DC power transmission system having the same configuration as in FIG. 12 except the communication network configuration, the same communication packets 161 to 166 as in FIG. 12 are transmitted via a high-speed communication network. An example in which communication packets CP1 to CP4 are transmitted as communication packets at normal times via a high-speed communication network is additionally illustrated.

The communication packets used at normal times include a communication packet for transmitting control information of a power converter in normal operation. An example is a communication packet used in data communication at a high sample rate in a process bus based on IEC61850 standards (that is, data communication with a sample rate of 96 kHz).

A priority is set in a communication packet transmitted in the general-purpose high-speed communication network. Specifically, a high priority is set for a communication packet pertaining to the fault processing, and a low priority is set for a communication packet at normal times. A communication packet with high priority is transmitted and received preferentially over a communication packet with low priority. When a communication packet with high priority is transmitted during communication of a communication packet with low priority, the communication of the communication packet with low priority is suspended and the communication packet with high priority is transmitted preferentially.

Specifically, in the example in FIG. 14, communication packet CP1 with low priority is transmitted via the general-purpose high-speed communication network from time t31 to time t32.

At the subsequent time t33, for example, bus protective device B1 starts transmission of communication packet CP2 with low priority to transmission line protective device T1.

At the subsequent time t34, bus protective device B1 suspends transmission of communication packet CP2 with low priority in order to issue communication packet 161 with high priority. During suspension of communication packet CP2, bus protective device B1 transmits communication packet 161 with high priority to the common control device. Furthermore, transmission line protective device T1 transmits communication packet 162 with high priority to the common control device.

At the subsequent time t35, upon completion of transmission and reception of communication packet 162 with high priority, bus protective device B1 resumes transmission of communication packet CP2 with low priority.

At the subsequent time t36, transmission line protective device T2 requests bus protective device B1 to suspend transmission of communication packet CP2 with low priority in order to issue communication packet 163 with high priority. When transmission of communication packet CP2 is suspended, transmission line protective device T2 transmits communication packet 163 with high priority to the common control device.

At the subsequent time t37, upon completion of transmission and reception of communication packet 163 with high priority, bus protective device B1 resumes transmission of communication packet CP2 with low priority.

At the subsequent time t38, protective device CC1 for power converter requests bus protective device B1 to suspend transmission of communication packet CP2 with low priority in order to issue communication packet 164 with high priority. When transmission of communication packet CP2 is suspended, protective device CC1 for power converter transmits communication packet 164 with high priority to the common control device.

At the subsequent time t39, upon completion of transmission and reception of communication packet 164 with high priority, bus protective device B1 resumes transmission of communication packet CP2 with low priority.

At the subsequent time t40, protective device PC1 for power converter requests bus protective device B1 to suspend transmission of communication packet CP2 with low priority in order to issue communication packet 165 with high priority. When transmission of communication packet CP2 is suspended, protective device PC1 for power converter transmits communication packet 165 with high priority to the common control device.

At the subsequent time t41, upon completion of transmission and reception of communication packet 165 with high priority, bus protective device B1 resumes transmission of communication packet CP2 with low priority. At time t42, transmission and reception of communication packet CP2 is completed.

At the subsequent time t43, for example, bus protective device B1 starts transmission of communication packet CP3 with low priority to transmission line protective device T1.

The common control device receiving communication packets 161 to 165 with high priority including fault information from the individual control protective devices performs processing such as estimation of a fault occurrence zone in a period 156 from time t41 to time t44.

At time t44, the common control device requests bus protective device B1 to suspend transmission of communication packet CP3 with low priority in order to transmit a reclosing instruction based on the result of estimation of a fault occurrence zone. When transmission of communication packet CP3 is suspended, the common control device transmits communication packet 166 with high priority including a reclosing instruction to each individual protective device provided in a deenergized protection zone other than the estimated fault occurrence zone. The common control device may broadcast communication packet 166 including a reclosing instruction, using broadcasting communication or multicasting communication targeted only for transmission line protective devices.

At the subsequent time t45, upon completion of transmission and reception of communication packet 166 with high priority, bus protective device B1 resumes transmission of communication packet CP3 with low priority. At time t46, transmission and reception of communication packet CP3 is completed.

Furthermore, at the subsequent time t47 to time t48, communication packet CP4 with low priority is transmitted via the general-purpose high-speed communication network.

Preferably, communication packets 161 to 165 in FIG. 14 transmitted from the individual control protective devices are configured in the same manner as in FIG. 13(A). Preferably, communication packet 166 in FIG. 14 transmitted from the common control device is configured in the same manner as in FIG. 13(B). Since only the data indicating a fault detection signal, a timestamp, and a reclosing instruction is the payload, the communication time pertaining to fault processing can be minimized, thereby reducing the response time from fault detection to reclosing instruction.

When a network with a sufficiently high transmission rate (for example, 10 GBase-T) is used and a communication time (time slot) can be sufficiently reduced by minimizing the number of objects that constitute the payload, communication data in the syntax in conformity with ASN.1 may be used as in FIG. 12.

Effects of Second Embodiment

In the multi-terminal DC power transmission system of the second embodiment, the communication scheme as described above is employed depending on the configuration of the communication network to implement high-speed communication between the common control device and each individual control protective device.

Third Embodiment

In multi-terminal DC power transmission system 20 illustrated in FIG. 2, each DC transmission line is provided with DC circuit breakers and transmission line protective devices at both ends. A modification may be made such that one protection zone includes a plurality of DC transmission lines depending on the configuration of multi-terminal DC power grid 21. This modification can reduce the number of transmission line protective devices arranged and the number of DC circuit breakers arranged, leading to cost reduction. Furthermore, when the time division multiplex communication scheme described with reference to FIG. 12 is employed as a communication scheme in the high-speed communication network, the number of time slots can be reduced and therefore faster communication can be implemented. A specific description will be given below with reference to FIG. 15.

Figure 15:
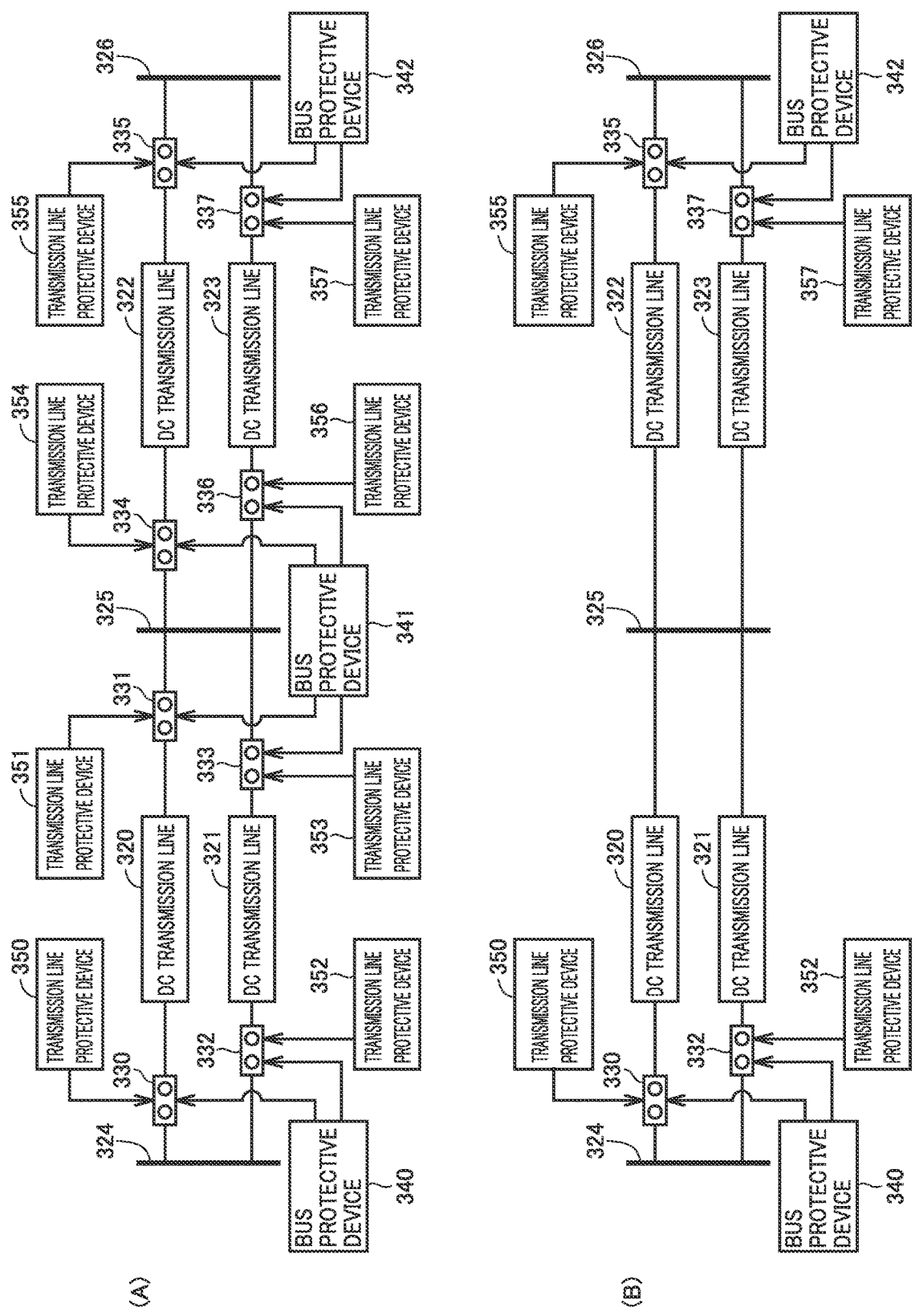
FIG. 15 is a diagram for explaining a configuration example of a multi-terminal DC power transmission system of a third embodiment.

FIG. 15 is a diagram for explaining a configuration example of a multi-terminal DC power transmission system of a third embodiment. In FIG. 15(A), a protection zone is set for each DC transmission line and for each DC bus, in the same manner as in FIG. 2. In FIG. 15(B), one protection zone includes a DC bus and a plurality of DC transmission lines in the same configuration of DC power grid as in FIG. 15(A).

Specifically, the DC power grid illustrated in FIG. 15(A) includes DC transmission lines 320 to 323 and DC buses 324 to 326. DC transmission lines 320, 321 connect DC bus 324 and DC bus 325. DC transmission lines 322, 323 connect DC bus 325 and DC bus 326.

In the multi-terminal DC power grid in FIG. 15(A), DC circuit breakers 330, 332 are connected between DC bus 324 and DC transmission lines 320, 321, respectively. DC circuit breakers 331, 333, 334, 336 are connected between DC bus 325 and DC transmission lines 320, 321, 322, 323, respectively. DC circuit breakers 335, 336 are connected between DC bus 326 and DC transmission lines 322, 323. The multi-terminal DC power grid in FIG. 15(A) is thus divided into seven protection zones configured with DC transmission lines 320 to 323 and DC buses 324 to 326.

The multi-terminal DC power transmission system includes bus protective devices 340, 341, 342 provided for DC buses 324, 325, 326, respectively, transmission line protective devices 350, 351 provided at both terminals of DC transmission line 320, transmission line protective devices 352, 353 provided at both terminals of DC transmission line 321, transmission line protective devices 354, 355 provided at both terminals of DC transmission line 322, and transmission line protective devices 356, 357 provided at both terminals of DC transmission line 323.

The multi-terminal DC power transmission system illustrated in FIG. 15(B) differs from the DC power transmission system illustrated in FIG. 15(A) in that DC circuit breakers 331, 333, 334, 336 are removed. In this case, DC transmission lines 320 to 323 and DC bus 325 constitute one protection zone. In order to protect this protection zone, transmission line protective devices 350, 352, 355, 357 are provided in the vicinity of four terminals of the protection zone. In the multi-terminal DC power transmission system illustrated in FIG. 15(B), compared with the multi-terminal DC power transmission system in FIG. 15(A), DC circuit breakers 331, 333, 334, 336, bus protective device 341, and transmission line protective devices 351, 353, 354, 356 can be removed.

Embodiments disclosed here should be understood as being illustrative rather than being limitative in all respects. The scope of the subject application is shown not in the foregoing description but in the claims, and it is intended that all modifications that come within the meaning and range of equivalence to the claims are embraced here.

REFERENCE SIGNS LIST 20 multi-terminal DC power transmission system, 21 multi-terminal DC power grid, 22 to 26, 320 to 323 DC transmission line, 30 to 32, 324 to 326 DC bus, 40 to 52, 330 to 337 DC circuit breaker, 53 to 58 AC circuit breaker, 61 to 66 power converter, 71, 72, 73 AC power system, 74, 75, 76 wind generator, 81 to 89, 241 to 243 DC current detector, 110, 113, 116 control protective device, 101, 102, 340, 341, 342, B1 to Bm bus protective device, 112, 115, 118, PC1 to PCp protective device for power converter, 103 to 106, 350 to 357, T1 to Tn transmission line protective device, 111, 114, 117, CC1 to CCp control device for power converter, 120 common control device, 121 high-speed communication network, 122 standard communication network, 161 to 166, CP1 to CP4 communication packet, 170 head flag, 172 timestamp, 173 fault signal, 175 reclosing instruction.

The invention claimed is:

1. A multi-terminal DC power transmission system comprising:
   a multi-terminal DC power grid including a plurality of protection zones, each protection zone being divided from an adjacent protection zone by a DC circuit breaker;
   a plurality of individual protective devices provided corresponding to the protection zones; and
   a common control device connected to the individual protective devices via a first communication network, wherein
   each of the individual protective devices is configured, when detecting change in voltage or current in a corresponding protection zone due to fault occurrence in any of the protection zones, to output a fault signal pertaining to the fault occurrence to the common control device via the first communication network and open a DC circuit breaker that divides the corresponding protection zone such that the corresponding protection zone is disconnected from the multi-terminal DC power grid and deenergized, and
   the common control device is configured to estimate a fault occurrence zone where a fault occurs among the protection zones, based on a plurality of received fault signals, each being the output fault signal, and request an individual protective device of the plurality of individual protection devices, corresponding to a deenergized protection zone of the plurality of protection zones excluding the fault occurrence zone to reclose the DC circuit breaker that divides the deenergized protection zone such that the deenergized protection zone is restored.

2. The multi-terminal DC power transmission system according to claim 1, wherein each of the individual protective devices is configured to transmit a timestamp attached to the fault signal to indicate a time when abnormality of the quantity of electricity is detected, and the common control device is configured to estimate a fault occurrence zone where a fault occurs among the protection zones, based on the timestamp attached to each of the received fault signals.

3. The multi-terminal DC power transmission system according to claim 2, wherein at least one individual protective device among the individual protective devices is configured, when detecting change in current in a corresponding protection zone due to the fault occurrence, to further detect a direction in which faulty current flows, and transmit the fault signal including information on the direction in which faulty current flows to the common control device, and the common control device is configured to estimate a fault occurrence zone where a fault occurs among the protection zones, based on the timestamp and the information on the direction in which faulty current flows.

4. The multi-terminal DC power transmission system according to claim 2, wherein among the protection zones, a first protection zone includes a first DC bus, the first DC bus is connected to a plurality of DC transmission lines included in a plurality of protection zones adjacent to the first protection zone, a first individual protective device provided corresponding to the first protection zone is configured, when detecting faulty current flowing in any of the DC transmission lines, to further detect a direction in which the faulty current flows and transmit the fault signal including information on the direction in which faulty current flows to the common control device, and the common control device is configured to estimate a fault occurrence zone where a fault occurs among the protection zones, based on the timestamp and the information on the direction in which faulty current flows.

5. The multi-terminal DC power transmission system according to claim 2, wherein payload of a communication packet transmitted from the individual protective devices to the common control device at a time of fault occurrence in the multi-terminal DC power grid is limited to the fault signal and the timestamp, and payload of a communication packet transmitted from the common control device to the individual protective devices at a time of fault occurrence in the multi-terminal DC power grid is limited to the request for reclosing.

6. The multi-terminal DC power transmission system according to claim 1, wherein the individual protective devices and the common control device are connected to each other via a second communication network different from the first communication network, the first communication network is used for communication between the individual protective devices and the common control device at a time of fault occurrence in the multi-terminal DC power grid, and the second communication network is used for communication between the individual protective devices and the common control device at normal times in the multi-terminal DC power grid.

7. The multi-terminal DC power transmission system according to claim 6, wherein a scheme of communication via the first communication network is a time division multiplex communication scheme, and time slots corresponding to the individual protective devices and the common control device are defined in advance.

8. The multi-terminal DC power transmission system according to claim 1, wherein a communication packet used in communication via the first communication network between the individual protective devices and the common control device at a time of fault occurrence in the multi-terminal DC power grid has a priority higher than a priority of a communication packet for any other purpose via the first communication network.

9. The multi-terminal DC power transmission system according to claim 1, wherein the common control device transmits a time synchronization signal to the individual protective devices.

10. The multi-terminal DC power transmission system according to claim 1, wherein the common control device and the individual protective devices receive a time synchronization signal from a common time synchronization server.

11. The multi-terminal DC power transmission system according to claim 1, wherein among the protection zones, a second protection zone includes:
    a second DC bus; and
    a first transmission line and a second transmission line connected to the second DC bus, and no DC circuit breaker is provided between each of the first transmission line and the second transmission line and the second DC bus.

12. A common control device of a multi-terminal DC power transmission system, the multi-terminal DC power transmission system comprising:

a multi-terminal DC power grid including a plurality of protection zones, each protection zone being divided from an adjacent protection zone by a DC circuit breaker; and a plurality of individual protective devices provided corresponding to the protection zones, wherein each of the individual protective devices is configured, when detecting change in voltage or current in a corresponding protection zone due to fault occurrence in any of the protection zones, to output a fault signal pertaining to the fault occurrence and open a DC circuit breaker that divides the corresponding protection zone such that the corresponding protection zone is disconnected from the multi-terminal DC power grid and deenergized, the common control device comprising:

a communication unit connected to the individual protective devices via a first communication network, the communication unit being configured to receive the fault signal from each of the individual protective devices detecting change in voltage or current due to the fault occurrence; and a computation processing unit configured to estimate a fault occurrence zone where a fault occurs among the protection zones, based on a plurality of fault signals, each being the received fault signal, wherein the communication unit is configured to output an instruction to reclose a DC circuit breaker to an individual protective device of the plurality of individual protective devices, corresponding to a deenergized protection zone of the plurality of protections zones excluding the fault occurrence zone such that the deenergized protection zone is restored.

13. A fault recovery method for a multi-terminal DC power transmission system,
the multi-terminal DC power transmission system comprising:
a multi-terminal DC power grid including a plurality of protection zones, each protection zone being divided from an adjacent protection zone by a DC circuit breaker;
a plurality of individual protective devices provided corresponding to the protection zones; and
a common control device connected to the individual protective devices via a first communication network,
the fault recovery method comprising:
when detecting, by any one of the individual protective devices, change in voltage or current in a corresponding protection zone due to fault occurrence in any of the protection zones, outputting, by the individual protective device, a fault signal pertaining to the fault occurrence to the common control device via the first communication network, and opening, by the individual protective device, a DC circuit breaker that divides the corresponding protection zone such that the corresponding protection zone is disconnected from the multi-terminal DC power grid and deenergized;
estimating, by the common control device, a fault occurrence zone where a fault occurs among the protection zones, based on a plurality of received fault signals, each being the output fault signal; and
requesting, by the common control device, an individual protective device of the plurality of individual protective devices, corresponding to a deenergized protection zone of the plurality of protection zones to reclose the DC circuit breaker that divides the deenergized protection zone such that the deenergized protection zone is restored.

\* \* \* \* \*